United States Patent
Lu et al.

(10) Patent No.: US 12,438,244 B2
(45) Date of Patent: Oct. 7, 2025

(54) DESIGNS OF HIGH-POWER GEL-ASSISTED BIPOLAR SOLID-STATE BATTERY

(71) Applicant: GM GLOBAL TECHNOLOGY OPERATIONS LLC, Detroit, MI (US)

(72) Inventors: Yong Lu, Shanghai (CN); Zhe Li, Shanghai (CN); Mengyan Hou, Shanghai (CN); Qili Su, Shanghai (CN); Meiyuan Wu, Shanghai (CN); Xiaochao Que, Shanghai (CN); Haijing Liu, Shanghai (CN); Si Chen, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 859 days.

(21) Appl. No.: 17/696,567

(22) Filed: Mar. 16, 2022

(65) Prior Publication Data
US 2023/0246310 A1    Aug. 3, 2023

(30) Foreign Application Priority Data
Jan. 28, 2022 (CN) .......................... 202210107394.5

(51) Int. Cl.
*H01M 10/0525* (2010.01)
*H01M 4/131* (2010.01)
(Continued)

(52) U.S. Cl.
CPC ......... *H01M 50/543* (2021.01); *H01M 4/131* (2013.01); *H01M 4/583* (2013.01);
(Continued)

(58) Field of Classification Search
CPC .... H01M 50/543; H01M 4/131; H01M 4/583; H01M 10/0525; H01M 50/411;
(Continued)

(56) References Cited

U.S. PATENT DOCUMENTS

| 10,319,978 B2 | 6/2019 | Zeng et al. |
| 10,658,663 B2 | 5/2020 | Zhang et al. |

(Continued)

FOREIGN PATENT DOCUMENTS

| CN | 116565472 A | 8/2023 |
| DE | 102022105203 B3 | 7/2023 |

OTHER PUBLICATIONS

Yoshima et al, "Thin hybrid electrolyte based on garnet-type lithium-ion conductor Li7La3Zr2O12 for 12 V-class bipolar batteries"; Journal of Power Sources 302 (2016) 283e290; journal homepage: www.elsevier.com/lo cate/jpowsou.
(Continued)

*Primary Examiner* — Cynthia K Walls
(74) *Attorney, Agent, or Firm* — Harness, Dickey & Pierce, P.L.C.

(57) ABSTRACT

A high-power gel-assisted battery stack that cycles lithium ions is provided with two terminal electrodes having opposite polarities and at least one bipolar electrode assembly disposed therebetween. A first electrode is disposed on a first side of a bipolar current collector and a second electrode with an opposite polarity to the first electrode is disposed on a second side of the bipolar current collector. Each electrode includes a porous layer having an electroactive material and a solid-state electrolyte disposed in a polymeric binder. A polymer gel electrolyte is distributed in pores of the porous. The stack also includes at least two free-standing gel separator layers each being disposed between the at least one bipolar electrode assembly and terminal electrodes. Each respective free-standing gel separator layer comprises polyacrylonitrile (PAN) and an electrolyte distributed therein. The high-power gel-assisted battery stack has a maximum voltage rating of ≥about 12V.

18 Claims, 4 Drawing Sheets

(51) Int. Cl.
  *H01M 4/583* (2010.01)
  *H01M 50/411* (2021.01)
  *H01M 50/449* (2021.01)
  *H01M 50/46* (2021.01)
  *H01M 50/543* (2021.01)
  *H01M 4/02* (2006.01)

(52) U.S. Cl.
  CPC ..... *H01M 10/0525* (2013.01); *H01M 50/411* (2021.01); *H01M 50/449* (2021.01); *H01M 50/46* (2021.01); *H01M 2004/029* (2013.01); *H01M 2300/0082* (2013.01)

(58) Field of Classification Search
  CPC ............... H01M 50/449; H01M 50/46; H01M 2004/029; H01M 2300/0082; H01M 4/133; H01M 2010/4292; H01M 2300/0068; H01M 4/136; H01M 4/364; H01M 4/366; H01M 4/505; H01M 4/587; H01M 4/62; H01M 4/622; H01M 2300/0085; H01M 10/0565; H01M 4/5825; H01M 4/625; H01M 10/0585; H01M 50/42; H01M 4/13; H01M 50/502; H01M 50/54; Y02E 60/10
  See application file for complete search history.

(56) References Cited

U.S. PATENT DOCUMENTS

| | | | |
|---|---|---|---|
| 10,714,756 B2 | 7/2020 | Dai et al. | |
| 10,944,100 B2 | 3/2021 | Liu et al. | |
| 11,121,375 B2 | 9/2021 | Hou et al. | |
| 11,145,922 B2 | 10/2021 | Li et al. | |
| 11,205,798 B2 | 12/2021 | Li et al. | |
| 11,217,826 B2 | 1/2022 | Li et al. | |
| 11,358,647 B1 | 6/2022 | Newcomb et al. | |
| 11,383,771 B1 | 7/2022 | Newcomb et al. | |
| 11,404,714 B2 | 8/2022 | Hou et al. | |
| 2001/0055718 A1* | 12/2001 | Li | H01M 4/136 429/231.1 |
| 2002/0055047 A1* | 5/2002 | Satoh | H01M 4/133 429/231.95 |
| 2006/0183024 A1* | 8/2006 | Suzuki | H01M 10/0525 429/231.95 |
| 2012/0148902 A1* | 6/2012 | Kwon | H01M 4/75 429/165 |
| 2014/0010752 A1* | 1/2014 | Kagei | C01G 45/12 423/594.15 |
| 2017/0358825 A1* | 12/2017 | Yoshima | H01M 10/0585 |
| 2019/0088926 A1 | 3/2019 | Takami et al. | |
| 2019/0123326 A1 | 4/2019 | Yang | |
| 2019/0372157 A1* | 12/2019 | Oura | H01M 10/0525 |
| 2020/0403267 A1 | 12/2020 | Li et al. | |
| 2021/0020929 A1* | 1/2021 | Kong | H01M 10/0565 |
| 2021/0036310 A1 | 2/2021 | Hou et al. | |
| 2021/0036360 A1 | 2/2021 | Li et al. | |
| 2021/0050596 A1 | 2/2021 | Li et al. | |
| 2021/0057776 A1 | 2/2021 | Lu et al. | |
| 2021/0066746 A1 | 3/2021 | Hou et al. | |
| 2021/0091358 A1 | 3/2021 | Uno et al. | |
| 2021/0111426 A1 | 4/2021 | Li et al. | |
| 2021/0135224 A1 | 5/2021 | Hou et al. | |
| 2022/0102756 A1 | 3/2022 | Frieberg et al. | |
| 2022/0123352 A1 | 4/2022 | Li et al. | |
| 2022/0140422 A1 | 5/2022 | Chen et al. | |
| 2022/0166031 A1 | 5/2022 | Li et al. | |
| 2022/0181598 A1 | 6/2022 | Lu et al. | |
| 2022/0181685 A1 | 6/2022 | Li et al. | |
| 2022/0212449 A1 | 7/2022 | Newcomb et al. | |
| 2022/0227425 A1 | 7/2022 | Newcomb et al. | |
| 2022/0255130 A1 | 8/2022 | Frieberg | |
| 2022/0263055 A1 | 8/2022 | Hou et al. | |
| 2022/0263129 A1 | 8/2022 | Lu et al. | |
| 2022/0302526 A1 | 9/2022 | Li et al. | |
| 2022/0407079 A1 | 12/2022 | Lu et al. | |
| 2023/0015143 A1 | 1/2023 | Su et al. | |
| 2023/0024667 A1 | 1/2023 | Li et al. | |
| 2023/0025830 A1 | 1/2023 | Su et al. | |
| 2023/0046608 A1 | 2/2023 | Su et al. | |
| 2023/0072660 A1 | 3/2023 | Su et al. | |
| 2023/0074112 A1 | 3/2023 | Su et al. | |
| 2023/0128413 A1 | 4/2023 | Frieberg et al. | |
| 2023/0246310 A1 | 8/2023 | Lu et al. | |
| 2023/0344000 A1 | 10/2023 | Lu et al. | |

OTHER PUBLICATIONS

Chen et al; Abstract of "Ionogel Electrolytes for High-Performance Lithium Batteries: A Review"; Advanced Energy Materials; vol. 8, Issue 12; Jan. 31, 2018; https://onlinelibrary.wiley.com/doi/abs/10.1002/aenm.201702675.

Susan et al; Abstract of "Ion Gels Prepared by in Situ Radical Polymerization of Vinyl Monomers in an Ionic Liquid and Their Characterization as Polymer Electrolytes"; Journal of the American Chemical Society 127 (13):4976-83; May 2005; https://www.researchgate.net/publication/7938588.

Bradley R. Frieberg et al.; U.S. Appl. No. 17/551,753, filed Dec. 15, 2021; entitled "Solid Electrolyte Coating of Lithium-Doped Silicon Oxide Particles as Anode Active Material"; 39 pages.

Qili Su et al.; U.S. Appl. No. 17/560,673, filed Dec. 23, 2021; entitled "Folded Bipolar Battery Design"; 45 pages.

Qili Su et al.; U.S. Appl. No. 17/688,445, filed Mar. 7, 2022; entitled "Methods of Fabricating Bipolar Solid State Batteries"; 77 pages.

Yong Lu et al.; U.S. Appl. No. 17/696,567, filed Mar. 16, 2022; entitled "Designs of High-Power Gel-Assisted Bipolar Solid-State Battery"; 64 pages.

Qili Su et al.; U.S. Appl. No. 17/697,135, filed Mar. 17, 2022; entitled "Methods of Manufacturing Bipolar Solid-State Batteries"; 77 pages.

Qi Lu et al.; U.S. Appl. No. 17/698,865, filed Mar. 18, 2022; entitled "Bipolar Current Collector and Method of Making the Same"; 48 pages.

Zhe Li et al.; U.S. Appl. No. 17/707,524, filed Mar. 29, 2022; entitled "Argyrodite Solid Electrolytes for Solid-State Batteries and Methods of Making the Same"; 56 pages.

Yong Lu et al.; U.S. Appl. No. 17/884,410, filed Aug. 9, 2022, entitled "Fabrication Process for Polymer-Based Bipolar Batteries via In-Situ Polymerization"; 58 pages.

Qili Su et al.; U.S. Appl. No. 17/710,213, filed Mar. 31, 2022; entitled "Polymeric Gel Electrolyte Systems For High-Power Solid-State Battery"; 62 pages.

Qili Su et al.; U.S. Appl. No. 17/710,900, filed Mar. 31, 2022, entitled "Gel Electrolyte System For Solid State Battery"; 76 pages.

First Office Action for German Patent Application No. 10 2022 105 203.6 issued on Nov. 9, 2022, with correspondence from Manitz Finsterwald Patent- und Rechtsanwaltspartnerschaft mbB summarizing Office Action; 5 pages.

* cited by examiner

DESIGNS OF HIGH-POWER GEL-ASSISTED BIPOLAR SOLID-STATE BATTERY

CROSS-REFERENCE TO RELATED APPLICATIONS

This application claims the benefit of Chinese Patent Application No. 202210107394.5, filed on Jan. 28, 2022. The entire disclosure of the above application is incorporated herein by reference.

INTRODUCTION

This section provides background information related to the present disclosure which is not necessarily prior art.

The present disclosure pertains to high-power gel-assisted bipolar solid-state batteries.

Electrochemical energy storage devices, such as lithium-ion batteries, can be used in a variety of products, including automotive products such as start-stop systems (e.g., 12V start-stop systems), battery-assisted systems ("μBAS"), Hybrid Electric Vehicles ("HEVs"), and Electric Vehicles ("EVs"). Semi-solid and solid-state batteries have advantages over batteries that include an electrolyte, including a longer shelf life with lower self-discharge, simpler thermal management, a reduced need for packaging, and the ability to operate within a wider temperature window. For example, semi-solid electrolytes and/or solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries often experience comparatively low power capabilities. Low power capabilities may be a result of interfacial resistance within the solid-state electrodes and/or at the electrode, and a solid-state electrolyte layer interfacial resistance caused by limited contact, or void spaces, between the solid-state active particles and/or the solid-state electrolyte particles.

Moreover, all batteries suffer from diminished power generation when starting an engine in cold temperatures, often referred to as cold cranking amps (CCA). For example, the CCA rating refers to the current or number of amps a 12-volt battery can deliver at 0° F. for 30 seconds while maintaining a voltage of at least 7.2 volts. Thus, the higher the CCA rating, the greater the power of the battery generated at cold temperatures. Accordingly, it would be desirable to develop high-performance solid-state and/or semi-solid battery designs, materials, and methods that improve power capabilities, as well as energy density, especially at cold start temperatures.

SUMMARY

This section provides a general summary of the disclosure, and is not a comprehensive disclosure of its full scope or all of its features.

The present disclosure relates to high-power gel-assisted bipolar solid-state batteries.

In various aspects, a high-power gel-assisted battery stack that cycles lithium ions is provided. The high-power gel-assisted battery stack may include a first terminal electrode having a first polarity, a second terminal electrode having a second polarity opposite from the first polarity, and at least one bipolar electrode assembly disposed between the first terminal electrode and the second terminal electrode. The at least one bipolar electrode assembly has a first electrode with the first polarity disposed on a first side of a bipolar current collector and a second electrode with the second polarity opposite to the first polarity disposed on a second side of the bipolar current collector. The first electrode includes a first porous layer including a first electroactive material that reversibly cycles lithium ions and a first solid-state electrolyte disposed in a first polymeric binder. The first porous layer also includes a first polymer gel electrolyte distributed in pores of the first porous layer. The second electrode includes a second porous layer including a second electroactive material that reversibly cycles lithium ions and a second solid-state electrolyte disposed in a second polymeric binder. A second polymer gel electrolyte is distributed in pores of the second porous layer. At least two free-standing gel separator layers are also included in the high-power gel-assisted battery stack. Each respective gel separator layer is disposed between the at least one bipolar electrode assembly and the first terminal electrode or between the at least one bipolar electrode assembly and the second terminal electrode. Further, each respective free-standing gel separator layer includes polyacrylonitrile (PAN) and an electrolyte distributed therein. The high-power gel-assisted battery has a maximum voltage rating of greater than or equal to about 12V.

In certain aspects, at least one of the first electrode or the second electrode further includes an electrically conductive particles distributed in the first porous layer or the second porous layer. Each electrically conductive particle is independently selected from the group consisting of: carbon black, carbon fibers, carbon nanotubes, graphene, graphene oxide, graphite, acetylene black, and combinations thereof.

In certain aspects, the first electrode is a positive electrode and the first electroactive material is selected from the group consisting of: $LiMn_2O_4$ (LMO), $LiMn_xFe_{1-x}PO_4$ (LMFP), where x ranges from about 0.6 to about 0.75, and combinations thereof. The solid-state electrolyte is selected from the group consisting of: $Li_{7-x}La_3Zr_{2-x}M_xO_{12}$ (LLZO) where M is a metal selected from tantalum (Ta), niobium (Nb), bismuth (Bi), tin (Sn), and the like, where $0 \leq x < 2$; $Li_xLa_y$-$TiO_3$ (LLTO) where $0 < x < 1$ and $0 < y < 1$, $Li_{1+x+y}Al_xTi_{2-x}P_{3-y}O_{12}$ where $0 \leq x < 2$ and $0 \leq y < 3$ (LATP), $Li_{2+2x}Zn_{1-x}GeO_4$ where $0 < x < 1$ (LISICON), $Li_2PO_2N$ (LIPON), $Li_xLa_{2/3-x}TiO_3$ where $0 < x < 2/3$, $Li_{1+x}Al_xTi_{2-x}(PO_4)_3$ where $0 \leq x < 2$, and combinations thereof.

In certain aspects, the first electroactive material includes both $LiMn_2O_4$ (LMO) and $LiMn_xFe_{1-x}PO_4$ (LMFP), where x ranges from about 0.6 to about 0.75 with a carbon coating disposed thereon. The first porous layer includes greater than or equal to about 20 weight % to less than or equal to about 76 weight % of LMO and greater than or equal to about 20 weight % to less than or equal to about 76 weight % LMFP. The first solid-state electrolyte includes $Li_{1+x+y}Al_xTi_{2-x}P_{3-y}O_{12}$ where $0 \leq x < 2$ and $0 \leq y < 3$ (LATP).

In certain aspects, both the first polymer gel electrolyte and the second polymer gel electrolyte independently includes a polymeric host and an electrolyte including a lithium salt, ethylene carbonate (EC) and γ-butyrolactone (GBL). The polymeric host is selected from the group consisting of: polyvinylidene fluoride (PVDF), polyvinylidene fluoride-hexafluoropropylene (PVDF-HFP), and combinations thereof. The lithium salt is selected from the group consisting of: lithium bis(trifluoromethanesulfonyl)imide (LiTFSI), lithium bis(oxalato)borate (LiBOB), lithium tetrafluoroborate ($LiBF_4$), and combinations thereof. A ratio of EC to GBL solvents is greater than or equal to about 1:1 to less than or equal to about 1:1.5.

In certain further aspects, the gel electrolyte includes greater than 0 weight % to less than or equal to about 10 weight % of the polymeric host and greater than or equal to about 90 weight % to less than about 100 weight % of the electrolyte.

In certain aspects, the electrolyte in each respective gel separator layer includes a lithium salt selected from the group consisting of: lithium bis(trifluoromethanesulfonyl) imide (LiTFSI), lithium tetrafluoroborate (LiBF$_4$), and combinations thereof, ethylene carbonate (EC) and γ-butyrolactone (GBL). A ratio of EC to GBL solvents is greater than or equal to about 1:1 to less than or equal to about 1:1.5.

In certain aspects, each of the free-standing gel separator layers has greater than or equal to about 10 weight % to less than or equal to about 15 weight % polyacrylonitrile (PAN) and greater than or equal to about 75 weight % to less than or equal to about 90 weight % of the electrolyte.

In certain aspects, the high-power gel-assisted battery stack has a negative to positive areal ratio of greater than or equal to about 1 to less than or equal to about 1.15.

In certain aspects, the high-power gel-assisted battery stack further includes a plurality of bipolar electrode assemblies disposed between the first terminal electrode and the second terminal electrode and a plurality of free-standing gel separator layers. Each respective free-standing gel separator layer of the plurality is disposed between either: adjacent bipolar electrode assemblies of the plurality, the first terminal electrode and an adjacent free-standing gel separator layer of the plurality, and the second terminal electrode and an adjacent free-standing gel separator layer of the plurality.

In certain aspects, the second electrode is a negative electrode and the second electroactive material includes graphite and the second solid-state electrolyte includes $Li_{7-x}La_3Zr_{2-x}M_xO_{12}$ (LLZO) where M is a metal selected from tantalum (Ta), niobium (Nb), bismuth (Bi), tin (Sn), and the like, where $0 \leq x < 2$.

The present disclosure also contemplates a high-power gel-assisted battery stack that cycles lithium ions including at least one bipolar electrode assembly disposed between a terminal positive electrode and a terminal negative electrode. The at least one bipolar electrode assembly has a positive electrode disposed on a first side of a bipolar current collector and a negative electrode disposed on a second side of the bipolar current collector. The positive electrode includes a first porous composite layer including a first polymeric binder, a first electroactive material selected from the group consisting of: $LiMn_2O_4$ (LMO), $LiMn_xFe_{1-x}PO_4$ (LMFP), where x ranges from about 0.6 to about 0.75, and combinations thereof, a first solid state electrolyte including $Li_{1+x+y}Al_xTi_{2-x}P_{3-y}O_{12}$ where $0 \leq x < 2$ and $0 \leq y < 3$ (LATP), a first electrically conductive particle, and a first polymer gel electrolyte distributed in pores of the first porous composite layer. The first porous composite layer includes greater than or equal to about 20 weight % to less than or equal to about 76 weight % of LMO and greater than or equal to about 20 weight % to less than or equal to about 76 weight % LMFP. The negative electrode includes a second porous composite layer including a second polymeric binder, a second electroactive material including graphite, a second solid state electrolyte including $Li_{7-x}La_3Zr_{2-x}M_xO_{12}$ (LLZO) where M is a metal selected from tantalum (Ta), niobium (Nb), bismuth (Bi), tin (Sn), and the like, where $0 \leq x < 2$, a second electrically conductive particle, and a second polymer gel electrolyte distributed in pores of the second porous composite layer. The high-power gel-assisted battery stack also includes at least two free-standing gel separator layers. Each respective gel separator layer is disposed between the at least one bipolar electrode assembly and the terminal positive electrode and the at least one bipolar electrode assembly and the terminal negative electrode. Each respective free-standing gel separator layer includes polyacrylonitrile (PAN) and an electrolyte distributed therein. The high-power gel-assisted battery has a maximum voltage rating of greater than or equal to about 12V.

In certain aspects, both the first polymer gel electrolyte and the second polymer gel electrolyte independently includes a polymeric host and a electrolyte including a lithium salt, ethylene carbonate (EC) and γ-butyrolactone (GBL), wherein the polymeric host is selected from the group consisting of: polyvinylidene fluoride (PVDF), polyvinylidene fluoride-hexafluoropropylene (PVDF-HFP), and combinations thereof, the lithium salt is selected from the group consisting of: lithium bis(trifluoromethanesulfonyl) imide (LiTFSI), lithium bis(oxalato)borate (LiBOB), lithium tetrafluoroborate (LiBF$_4$), and combinations thereof. A ratio of EC to GBL solvents is greater than or equal to about 1:1 to less than or equal to about 1:1.5.

In certain aspects, the gel electrolyte includes greater than 0 weight % to less than or equal to about 10 weight % and greater than or equal to about 90 weight % to less than about 100 weight % of the electrolyte.

In certain aspects, the electrolyte in each respective gel separator layer includes a lithium salt selected from the group consisting of: lithium bis(trifluoromethanesulfonyl) imide (LiTFSI), lithium tetrafluoroborate (LiBF$_4$), and combinations thereof, ethylene carbonate (EC) and γ-butyrolactone (GBL). A ratio of EC to GBL solvents is greater than or equal to about 1:1 to less than or equal to about 1:1.5.

In certain aspects, each of the free-standing gel separator layers has greater than or equal to about 10 weight % to less than or equal to about 15 weight % polyacrylonitrile (PAN) and greater than or equal to about 75 weight % to less than or equal to about 90 weight % of the electrolyte.

In certain aspects, the high-power gel-assisted battery stack has a negative to positive areal ratio of greater than or equal to about 1 to less than or equal to about 1.15.

In certain aspects, the high-power gel-assisted battery stack further includes a plurality of the bipolar electrode assemblies disposed between the terminal positive electrode and the terminal negative electrode and a plurality of free-standing gel separator layers. Each respective free-standing gel separator layer is disposed between either: adjacent bipolar electrode assemblies of the plurality, the terminal positive electrode and an adjacent free-standing gel separator layer of the plurality, and the terminal negative electrode and an adjacent free-standing gel separator layer of the plurality.

In yet other variations, the present disclosure provides a high-power gel-assisted battery stack that cycles lithium ions including at least one bipolar electrode assembly disposed between a terminal positive electrode and a terminal negative electrode. The bipolar electrode assembly has a positive electrode disposed on a first side of a bipolar current collector and a negative electrode disposed on a second side of the bipolar current collector. The positive electrode includes a first porous composite layer including a first polymeric binder, a first electroactive material selected from the group consisting of: $LiMn_2O_4$ (LMO), $LiMn_xFe_{1-x}PO_4$ (LMFP), where x ranges from about 0.6 to about 0.75, and combinations thereof, a first solid state electrolyte including $Li_{1+x+y}Al_xTi_{2-x}P_{3-y}O_{12}$ where $0 \leq x < 2$ and $0 \leq y < 3$ (LATP), a first electrically conductive particle, and a first polymer gel electrolyte distributed in pores of the first porous composite layer. The negative electrode includes a second porous composite layer including a second polymeric binder, a second electroactive material including graphite, a second solid state electrolyte including $Li_{7-x}La_3Zr_{2-x}M_xO_{12}$ (LLZO) where M is a metal selected from tantalum (Ta), niobium (Nb), bismuth (Bi), tin (Sn), and the like, where 0≤x<2, a second electrically conductive particle, and a second polymer gel electrolyte distributed in pores of the second porous composite layer. The high-power gel-assisted battery stack also includes at least two free-standing gel separator layers. Each respective gel separator layer is disposed between the at least one bipolar electrode assembly and the terminal positive electrode and the at least one bipolar electrode assembly and the terminal negative electrode. Each respective free-standing gel separator layer includes polyacrylonitrile (PAN) and an electrolyte distributed therein. The high-power gel-assisted battery stack also includes a blocker composite composition disposed along terminal edges of the at least one bipolar electrode assembly and the at least two free-standing gel separator layers. The blocker composite composition includes a polymeric matrix with a plurality of inorganic particles distributed therein. The high-power gel-assisted battery has a negative to positive areal ratio of greater than or equal to about 1 to less than or equal to about 1.15, a maximum voltage rating of greater than or equal to about 12V, and a capacity of greater than or equal to about 24 mAh.

In certain aspects, the first electroactive material includes both $LiMn_2O_4$ (LMO) and $LiMn_xFe_{1-x}PO_4$ (LMFP), where x ranges from about 0.6 to about 0.75 with a carbon coating disposed thereon. The first porous composite layer includes greater than or equal to about 20 weight % to less than or equal to about 76 weight % of LMO and greater than or equal to about 20 weight % to less than or equal to about 76 weight % LMFP. The first solid-state electrolyte includes $Li_{1+x+y}Al_xTi_{2-x}P_{3-y}O_{12}$ where 0≤x<2 and 0≤y<3 (LATP), and the first polymer gel electrolyte and the second polymer gel electrolyte independently includes a polymeric host and an electrolyte including a lithium salt, ethylene carbonate (EC) and γ-butyrolactone (GBL). The polymeric host is selected from the group consisting of: polyvinylidene fluoride (PVDF), polyvinylidene fluoride-hexafluoropropylene (PVDF-HFP), and combinations thereof, and the lithium salt is selected from the group consisting of: lithium bis(trifluoromethanesulfonyl)imide (LiTFSI), lithium bis(oxalato)borate (LiBOB), lithium tetrafluoroborate ($LiBF_4$), and combinations thereof. A ratio of EC to GBL solvents is greater than or equal to about 1:1 to less than or equal to about 1:1.5.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 3A and 3B show discharge rate performance at different discharge rates (1, 2, 5, 10 C) for the test cell while charged at 1 C rate. FIG. 3A shows capacity retention (%) versus cycle number. FIG. 3B shows voltage (V) versus capacity (mAh). FIG. 3C shows cycling performance of the test cell with capacity retention (%) on the left y-axis and Coulomb efficiency (%) on the right y-axis versus cycle number.

FIG. 4A shows direct current resistance (DCR) (mOhms) for the pristine test cell prior to cycling, the test cell after 510 cycles, after 1,530 cycles, and 2,040 cycles at 45° C. The charge-discharge cycle was conducted between 60~80 state of the charge (SOC) at 1.5 C. FIG. 4B shows voltage (V) versus time for the pristine test cell prior to cycling, the test cell after 510 cycles, after 1,530 cycles, and 2,040 cycles. The minimum voltage capability of 7.2V is shown.

Corresponding reference numerals indicate corresponding parts throughout the several views of the drawings.

DETAILED DESCRIPTION

Figure 1:
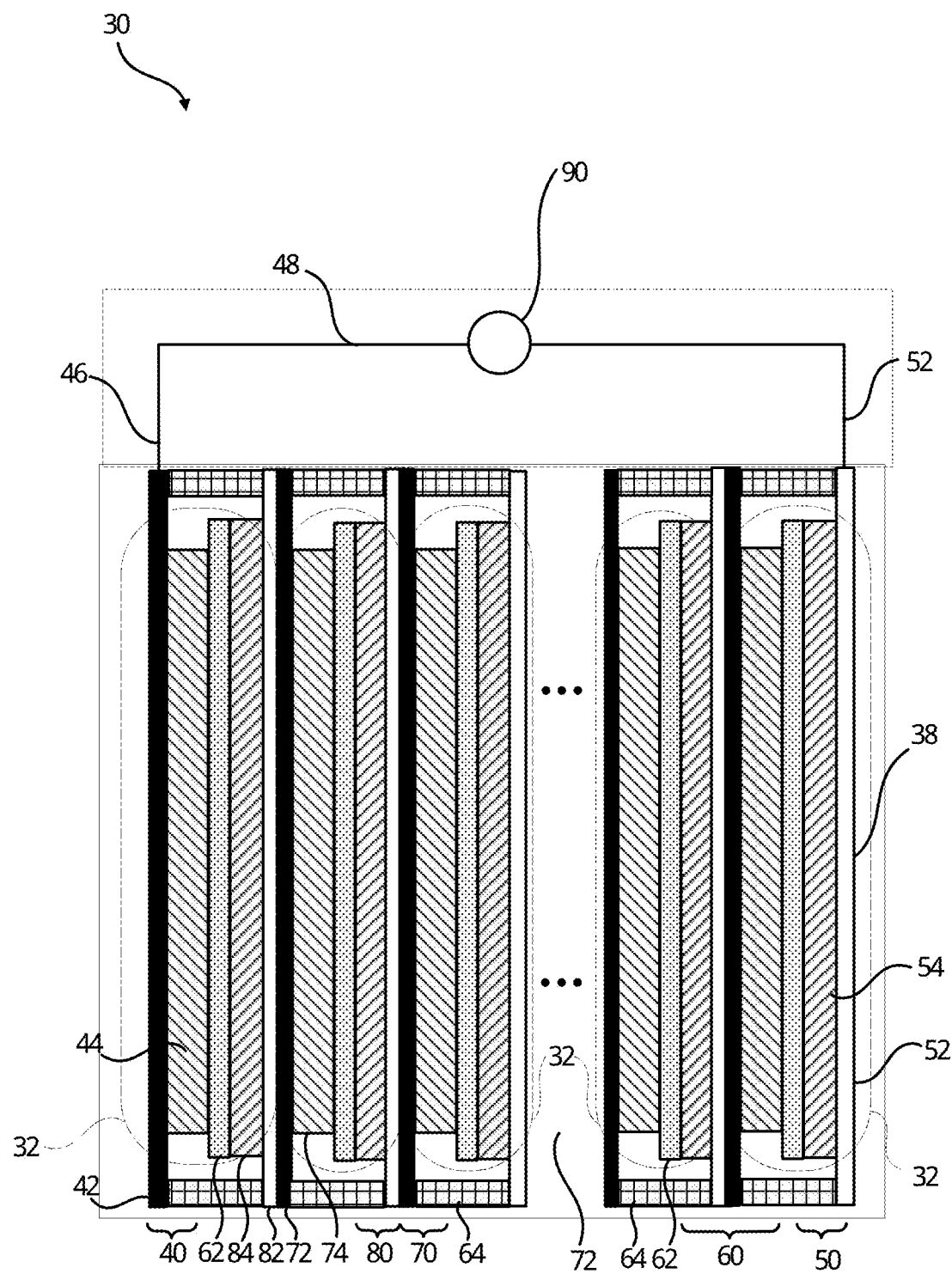
FIG. 1 is a schematic illustration of a simplified example of a cross-section of a battery for cycling lithium ions including a bipolar electrodes and gel components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

High-energy density electrochemical cells, such as batteries that cycle lithium ions, can be used in a variety of consumer products and vehicles, such as hybrid or electric vehicles. The current technology pertains to solid-state batteries (SSBs), for example, bipolar solid-state batteries, and methods of forming and using the same. Solid-state batteries may include at least one component having a solid state, for example, at least one solid electrode, but may also include semi-solid or gel, liquid, or gas components, in certain variations. In certain variations, the components in the solid-state battery may exclude liquids and only include components having a semi-solid (or gel) or solid state.

Typical batteries comprise at least one positive electrode or cathode, at least one negative electrode or anode, an electrolyte material, and optionally, a separator. A stack of lithium-ion battery cells may be electrically connected in an electrochemical device to increase overall output (for example, typically they are connected in parallel to increase current output). Solid-state batteries may have a bipolar stack design comprising a plurality of bipolar electrodes. A bipolar electrode is an assembled component that has both a positive polarity side and a negative polarity side. More specifically, a bipolar electrode includes a bipolar current collector that has both a positive electrode disposed on a positive side of the bipolar current collector and a negative electrode disposed on a negative side of the bipolar current collector, where the positive and negative current collector sides are adjacent to one another.

In various aspects, the present disclosure provides a novel high-power gel-assisted bipolar solid-state battery. Thermal stability, arising from volatile and flammable liquid electrolyte, is one of the key factors that affect the under-hood applications of traditional lithium-ion batteries. By replacing liquid electrolyte with solid-state electrolyte and/or non-flammable gel electrolyte, the thermal stability of the battery can be greatly enhanced. Meanwhile, bipolar structures can improve an energy density of solid-state battery pack by saving connecting tabs, battery packages, and the like. In particular, the high-power gel-assisted bipolar solid-state battery provided by various aspects of the present disclosure delivers excellent power capability, remarkable high temperature durability and superior cold performance, which is suitable for under-hood applications, such as 12 V start/stop battery.

Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

An exemplary and schematic illustration of a stack of solid-state electrochemical cells (also referred to as a "solid-state battery" and/or "battery") that cycles lithium ions is shown in FIG. 1. The battery 30 includes five (5) battery unit cells 32. In FIG. 1, the respective components are not shown to scale in dimension or thickness and further, there is spacing shown for inclusion of additional units 32 (not shown) in the stack. The battery 30 includes at least one terminal positive electrode 40 having a terminal positive current collector 42 and a positive active layer 44. The positive active layer 44 is disposed over the terminal positive current collector 42 and includes a positive electroactive material. The battery 30 also includes at least one terminal negative electrode 50 including a terminal negative current collector 52. A negative active layer 54 includes a negative electroactive material and is disposed over the terminal negative current collector 52.

The battery 30 further includes a plurality of bipolar electrodes 60, each of which includes a positive electrode 70 and a negative electrode 80 and thus has a dual polarity. The positive electrode 70 includes a positive current collector 72 and positive active layer 74 having a positive electroactive material. The bipolar electrodes 60 also each include a negative electrode 80 that include a negative current collector 82 and a negative active layer 84 having a negative electroactive material. The positive current collector 72 is disposed adjacent to the negative current collector 82. The positive electrode(s) 70 are oriented in a direction that faces towards the terminal negative electrode 50 (or an adjacent negative electrode from another bipolar electrode 60). The negative electrode(s) 80 are oriented in a direction that faces towards the terminal positive electrode 40 (or an adjacent positive electrode from another bipolar electrode 60).

The active layers 44, 74 of the positive electrodes 40, 70 are smaller than the active layers 54, 84 of the negative electrodes 50, 80 to help reduce potential short-circuiting when assembled. The terminal positive current collector 42 defines or is in contact with a positive external tab 46 that can be connected (e.g., via welding) to an external circuit 48 in electrical communication with an external load device 90. The terminal negative current collector 52 is also in electrical communication with the external circuit 48 and the load device 90.

The one or more positive active layers 44, 74 may each comprise a lithium-based positive electroactive material that is capable of undergoing lithium intercalation and deintercalation, absorption and desorption, alloying and dealloying, or plating and stripping, while functioning as a positive terminal of the battery 30. Generally, the positive active layers 44, 74 typically comprise the same lithium-based positive electroactive material, although they may have different compositions. As is known in the art and will be described further below, each electroactive layer (e.g., positive active layers 44, 74) may be a composite electrode that includes not only positive electroactive material particles, but also includes a polymeric binder and optionally a plurality of electrically conductive particles. Each positive active layer 44, 74 may further comprise a solid electrolyte and/or gel electrolyte mixed or distributed within the composite electrode.

The negative active layers 54, 84 may each comprise a negative electroactive material that is capable of undergoing lithium intercalation and deintercalation, absorption and desorption, alloying and dealloying, or plating and stripping, while functioning as a negative terminal of the battery 30. Generally, the negative active layers 54, 84 typically comprises the same negative electroactive material, although they may have different compositions. Negative electroactive materials may be metal layers or films or may include a composite that includes negative electroactive material particles mixed with a polymeric binder and optionally a plurality of electrically conductive particles. Each negative active layer 54, 84 may further comprise a solid electrolyte and/or a gel electrolyte mixed or distributed within the composite electrode.

The battery 30 further includes a polymeric gel separator layer 62 disposed between each bipolar electrode 60 and/or between one bipolar electrode 60 and the terminal electrodes (e.g., terminal positive electrode 40 or terminal negative electrode 50). The gel separator layer 62 may be a free-standing independent layer that is formed of a polymer and a non-flowing gel, meaning that it is self-supporting with structural integrity and can be handled as an independent layer (e.g., removed from a substrate) rather than only being a coating formed on another element. The polymeric gel separator layer 62 of the present disclosure serves as a gel electrolyte membrane having enhanced elasticity and greater polymer content, as compared to traditional porous polyolefin separators used in lithium-ion batteries. The traditional polyolefin separators are porous enough to store the liquid/gel electrolyte inside the pores. However, the polymeric gel separator layer 62 of the present disclosure fixes a liquid electrolyte by interacting (e.g., swelling) with the polymeric matrix via hydrogen bonding, Van der Waals forces, and the like. Thus, the polymeric gel separator layer 62 may be understood to be a free-standing elastic gel electrolyte layer.

The gel separator layers 62 may be disposed between a positive active layer, for example, positive active layer 74 on a first bipolar electrode 60 and negative active layer 84 of an adjacent second bipolar electrode 60. As noted above, the polymeric gel separator layer 62 may be a gel-like solid (or semi-solid) electrolyte in which an electrolyte (e.g., a salt in a solvent) is held in a matrix or network, for example, by interacting via bonding forces with the surrounding polymeric matrix. The gel separator layers 62 may be porous and can provide electrical separation between electrodes of opposite polarities, but to permit ions to flow therethrough. The free-standing gel separator layer(s) 62 may serve the role of both electrical insulator and ion conductor and thus eliminate the need for a traditional porous separator layer.

Notably, batteries prepared in accordance with certain aspects of the present disclosure may be free of liquid electrolytes and only contain solid-state and/or semi-solid or gel electrolytes. While liquid electrolyte is used initially as a precursor to form the polymeric gel separator layer and gel electrolyte components of the present disclosure, the liquid electrolyte is imbibed into and interacts with the polymeric host (e.g., by bonding described above) and thus serves as part of the gel electrolyte through the bonding between them and the polymer matrix. As a result, the incorporated liquid electrolyte provides a non-flowing property, in contrast to conventional liquid electrolyte that flows within pores of conventional separators and electrodes. By replacing liquid electrolyte with solid-state electrolyte or non-flammable gel electrolyte that does not flow within the battery, the thermal stability of the battery provided in accordance with certain aspects of the present disclosure is greatly enhanced.

The battery 30 further includes a blocker component 64 that is distributed near the terminal ends of each positive and negative current collector (terminal positive current collector 42, negative current collectors 52, and positive current collectors 72 and negative current collectors 82) in bipolar electrodes 60. The blocker component 64 spans between respective components, for example, between bipolar electrodes 60 or bipolar electrodes 60 and a terminal positive electrode 40 or terminal negative electrode 50. The blocker component 64 may comprise a polymer or a polymeric composite of a polymeric matrix having reinforcing materials distributed in the polymer that serves as a seal for an interior of the battery 30 and thus serves to retain the various components, including any gels (e.g., gel electrolyte) disposed therein.

As will be appreciated by those of skill in the art, the battery stack 30 is not limited to the number, configuration, or orientation of components shown and further may comprise a variety of additional components, including seals, gaskets, terminal plates, caps, and the like, by way of non-limiting example.

The load device 90 may be powered by the electric current passing through circuit 48 when the battery 30 is discharging. While the electrical load device 90 may be any number of known electrically-powered devices, a few specific examples include an electric motor for an electrified vehicle, a laptop computer, a tablet computer, a cellular phone, and cordless power tools or appliances. The load device 90 may also be an electricity-generating apparatus that charges the battery 30 for purposes of storing electrical energy.

The battery 30 can generate an electric current during discharge by way of reversible electrochemical reactions that occur when the circuit 48 is closed (to connect the negative electrodes 50, 80 and the positive electrodes 40, 70) and the negative electrode has a lower potential than the positive electrode. The chemical potential difference between the positive electrodes 40, 70 and the negative electrode 50, 80 drives electrons produced by a reaction, for example, the oxidation of intercalated material, at the negative electrodes 50, 80 through the external circuit 92 towards the positive electrodes 40, 70. Lithium ions that are also produced are concurrently transferred through the polymeric gel separator layer 62. The electrons flow through the external circuit 92 and the lithium ions migrate across the polymeric gel separator layer 62 to form intercalated lithium at the positive electrodes 40, 70. As noted above, gel electrolyte is typically also present in the negative electrodes 50, 80 and positive electrode 40, 70. The electric current passing through the external circuit 92 can be harnessed and directed through the load device 90 until the lithium in the negative electrodes 50, 80 is depleted and the capacity of the battery 30 is diminished.

Each of the negative electrode current collectors 52, 82, the negative electrodes 50, 80, the polymeric gel separator layer 62, the positive electrodes 40, 70, and the positive electrode current collectors 42, 72 can be prepared as relatively thin layers (for example, from 1 to 2 micrometers up to 1 millimeter or less in thickness, optionally greater than or equal to about 25 micrometers to less than or equal to about 250 micrometers) in the battery 30. Thus, a plurality of bipolar electrodes 60 are disposed parallel to one another to define a stack of units disposed between a terminal positive electrode 40 and a terminal negative electrode 50. The electrodes, including the bipolar electrodes 60 and terminal electrodes 40, 50, can be assembled in layers connected in series arrangement to provide a suitable electrical energy, battery voltage and power, for example, to yield a Series-Connected Elementary Cell Core ("SECC"). In various other instances, the battery 30 may further include bipolar electrodes 60 and terminal electrodes 40, 50 connected in parallel to provide suitable electrical energy, and power for example, to yield a Parallel-Connected Elementary Cell Core ("PECC"). In various another instances, the battery 30 may further include bipolar electrodes 60 and terminal electrodes 40, 50 connected in parallel and in series to provide suitable electrical energy, voltage and power. The units connected in series or parallel can obtain a target voltage and power capacity, for example, a 12 V battery with 50 Ah capacity. Bipolar battery structures like that shown in FIG. 1 serve to improve the energy density of solid-state battery pack, for example, by reducing connecting tabs, battery packages, and the like.

Thus, in certain embodiments the present application provides the gel-assisted bipolar battery design described herein that cycles lithium ions. Such a high-power gel-assisted bipolar solid-state battery delivers excellent power capability, remarkable high temperature durability and superior cold performance, and is particularly suitable for certain under-hood vehicle applications, such as 12 V start/stop battery. The battery includes a first terminal electrode having a first polarity, for example, a positive electrode or cathode. The battery also includes a second terminal electrode having a second polarity opposite from the first polarity, for example, a negative electrode or anode. The battery further includes at least one bipolar electrode assembly disposed between the first terminal electrode and the second terminal electrode.

The bipolar electrode assembly has a first electrode with the first polarity and a second electrode with the second polarity opposite to the first polarity. The first electrode includes a first current collector and a first active layer. The first active layer includes a first electroactive material (e.g., a plurality of first electroactive material particles) that reversibly cycles lithium ions, and a first polymer gel electrolyte distributed therein. The first active layer may also include a first solid-state electrolyte (e.g., a plurality of solid-state electrolyte particles) distributed therein. The bipolar electrode assembly is oriented so that the first electrode with the first polarity faces the second terminal electrode with the opposite second polarity.

In various aspects, the positive electroactive material may be a plurality of solid-state electroactive particles. In certain variations, the active layer of the positive electrode may include a positive electroactive material that is one of a layered-oxide cathode, a spinel cathode, and a polyanion cathode. For example, one or more positive electroactive materials may be selected from a spinel cathode material like $LiMn_2O_4$ (LMO). The positive electroactive material also may be a lithium phosphate compound, such as $LiMn_xFe_{1-x}PO_4$ (LMFP), where x ranges from about 0.6 to about 0.75. In various aspects, the plurality of solid-state electroactive particles that may comprise both $LiMn_2O_4$ (LMO) and $LiMn_xFe_{1-x}PO_4$ (LMFP).

In certain aspects, the positive solid-state electroactive particles may be coated (for example, with a carbon coating) and/or the positive electroactive material may be doped (for example, by aluminum and/or magnesium). For example, the LMFP may have a carbon coating.

In certain aspects, the positive solid-state electrolyte particles may be a material selected from the group consisting of: $Li_{7-x}La_3Zr_{2-x}M_xO_{12}$ (LLZO) where M is a metal selected from tantalum (Ta), niobium (Nb), bismuth (Bi), tin (Sn), and the like, where 0≤x<2; $Li_xLa_yTiO_3$ (LLTO) where 0≤x<1 and 0≤y<1, $Li_{1+x+y}Al_xTi_{2-x}P_{3-y}O_{12}$ where 0≤x<2 and 0≤y<3 (LATP), $Li_{2+2x}Zn_{1-x}GeO_4$ where 0<x<1 (LISICON), $Li_2PO_2N$ (LIPON), $Li_xLa_{2/3-x}TiO_3$, where $0<x<2/3$, $Li_{1+x}Al_xTi_{2-x}(PO_4)_3$ where $0\leq x<2$, $Li_{10}GeP_2S_{12}$, and combinations thereof.

In certain variations, the positive electrode may be a porous composite structure comprising positive electroactive particles and first solid-state electrolyte particles distributed with a polymeric binder matrix. The polymeric binder may be any of those used conventionally in the art, such as polyvinylidene difluoride (PVDF), poly(vinylidene fluoride)-co-hexafluoropropylene (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymers (SEBS), styrene butadiene styrene copolymers (SBS), polyethylene glycol (PEO), and/or lithium polyacrylate (LiPAA) binders. In certain variations, the binder comprises polyvinylidene difluoride (PVDF) or poly(vinylidene fluoride-co-hexafluoropropylene (PVDF-HFP).

The pores of the porous composite structure may be at least partially filled with a polymeric gel electrolyte. In various aspects, the polymeric gel electrolyte includes a non-volatile polymeric host that forms a gel, an electrolyte (e.g., with solvents), and optionally a lithium salt. The gel electrolyte system has a viscosity greater than or equal to about 10,000 centipoise ($mm^2/s$) at room temperature (about 21° C. or 70° F.). The polymeric host may be selected from the group consisting of: polyvinylidene fluoride (PVDF), polyvinylidene fluoride-hexafluoropropylene (PVDF-HFP), and combinations thereof. In certain variations, the polymeric host is polyvinylidene fluoride-hexafluoropropylene (PVDF-HFP). The polymeric host may be present at greater than 0 wt. % to less than or equal to about 10 wt. %, optionally, greater than or equal to about 2 wt. % to less than or equal to about 8 wt. %, optionally greater than or equal to about 4 wt. % to less than or equal to about 6 wt. %, for example, at about 5 wt. % of the total weight of the polymeric gel electrolyte.

The polymeric gel electrolyte may have a liquid electrolyte distributed therein, which when imbibed in the polymeric gel electrolyte to form a semi-solid or non-flowing gel phase overall. The electrolyte distributed within the polymeric gel electrolyte may include a lithium salt and a solvent. The lithium salt may include, for example, lithium bis(trifluoromethanesulfonyl)imide (LiTFSI), lithium bis(fluorosulfony)imide (LiFSI), lithium bis(oxalato)borate (LiBOB), lithium tetrafluoroborate ($LiBF_4$), and combinations thereof. In certain variations, the lithium salt may include both bis(trifluoromethanesulfonyl)imide (LiTFSI) and lithium tetrafluoroborate ($LiBF_4$). Each lithium salt may be present at greater than or equal to about 0.01 M to less than or equal to about 0.5 M, optionally greater than or equal to about 0.1 M to less than or equal to about 0.5 M, optionally greater than or equal to about 0.15 M to less than or equal to about 0.5 M, optionally about 0.4 M in the electrolyte.

In other aspects, the additional lithium salt LiBOB may be used as additive to form cathode solid electrolyte interface (CEI) and/or anode solid electrolyte interface (SEI). The LiBOB may be present at greater than or equal to about 0.5 wt. % to less than or equal to about 15 wt. %, optionally at greater than or equal to about 1 wt. % to less than or equal to about 10 wt. %, optionally greater than or equal to about 2 wt. % to less than or equal to about 5 wt. %, optionally greater than or equal to about 2 wt. % to less than or equal to about 3 wt. %, for example, about 2.5 wt. % in the liquid electrolyte. In one variation, the LiBOB is present at about 0.18 M.

A cumulative amount of all lithium salt(s) present in the liquid electrolyte may be greater than or equal to about 0.1 M to less than or equal to about 2M, optionally at greater than or equal to about 0.4 M to less than or equal to about 1.5 M, optionally greater than or equal to about 0.5 M to less than or equal to about 1.2 M, and in certain aspects, optionally about 1 M in the liquid electrolyte.

In certain aspects, the primary salts include both bis (trifluoromethanesulfonyl)imide (LiTFSI) and lithium tetrafluoroborate ($LiBF_4$), while small amounts of lithium bis(oxalato)borate (LiBOB) are included as an additive. By way of example, in one variation, the electrolyte may include 0.4 M LITFSI, 0.4 M $LiBF_4$, and 2.5 wt. % or 0.18 M of LiBOB the electrolyte.

One or more solvents in the electrolyte dissolve the lithium salt to enable good lithium ion conductivity, while desirably exhibiting a low vapor pressure (e.g., less than about 10 mmHg at 25° C.) and also being compatible with the polymeric host. In various aspects, the solvent includes, for example, carbonate solvents (such as, ethylene carbonate (EC), propylene carbonate (PC), glycerol carbonate, vinylene carbonate, fluoroethylene carbonate, 1,2-butylene carbonate, and the like), lactones (such as, γ-butyrolactone (GBL), δ-valerolactone, and the like), and combinations thereof. For example, the solvent may be selected from the group consisting of: ethylene carbonate (EC), γ-butyrolactone/gamma-butyrolactone (GBL), and combinations thereof. In certain variations, the solvent comprises both ethylene carbonate (EC) and γ-butyrolactone/gamma-butyrolactone (GBL).

A total amount of solvent may be present in the electrolyte at greater than or equal to about 80 wt. % to less than about 95 wt. %, optionally greater than or equal to about 82 wt. % to less than or equal to about 93 wt. %, optionally greater than or equal to about 84 wt. % to less than or equal to about 91 wt. %, for example, at about 87 wt. % of the total weight of the electrolyte.

In certain aspects, two solvents may be included in the electrolyte, ethylene carbonate (EC) and γ-butyrolactone/gamma-butyrolactone (GBL). A mass ratio of a first solvent, such as a carbonate solvent, like EC to a second solvent, such as a lactone solvent, like GBL, may be greater than or equal to about 1:1 to less than or equal to about 1:2, such as for example, about 1:1.5 (or 4:6).

For example, in certain variations, the electrolyte may include greater than or equal to about 80 wt. % to less than or equal to about 95 wt. %, and in certain aspects, optionally greater than or equal to about 82 wt. % to less than or equal to about 93 wt. % of a total amount of lithium salts, and greater than or equal to about 84 wt. % to less than or equal to about 91 wt. %, and in certain aspects, optionally greater than or equal to about 85 wt. % to less than or equal to about 90 wt. % of a total amount of the solvents.

By way of example, in one variation, the electrolyte may include 0.4 M LITFSI, 0.4 M $LiBF_4$, and 0.18 M (or 2.5 wt. %) LiBOB in a solvent comprising ethylene carbonate (EC) and gamma-butyrolactone (GBL) at a weight ratio of about 4:6 (or 1.5).

In certain variations, the polymeric gel electrolyte may further include a conventional additive. For example, the non-volatile gel may include greater than 0 wt. % to less than or equal to about 10 wt. % of the additive.

The porous composite structure defining the positive active layer may also include an electrically conductive material, such as a plurality of electrically conductive particles distributed therein. Electrically conductive materials may include, for example, carbon-based materials or a conductive polymer. Carbon-based materials may include, for example, particles of graphite, acetylene black (such as, KETCHEN™ black or DENKA™ black), carbon fibers and carbon nanotubes (CNTs, including single walled and multiwalled CNTs), graphene (such as, graphene oxide), graphite, carbon black (such as, Super P™), and the like. Examples of a conductive polymer may include polyaniline, polythiophene, polyacetylene, polypyrrole, and the like. In certain aspects, the electrically conductive particle comprises a carbon black, for example, having a surface area of greater than or equal to about 50 $m^2/g$ (BET), as measured "total surface area" via the Brunauer-Emmett-Teller (BET) method using nitrogen ($N_2$). One such electrically conductive carbon black is Super P™ carbon black conductive filler commercially available from Imerys Ltd. having a surface area of greater than about 63.5 $m^2/g$ (BET). In certain other aspects, the electrically conductive particle comprises a carbon nanotube (CNT), which also has a surface area of greater than or equal to about 50 $m^2/g$. In one variation, the conductive carbon-based material may be a conductive graphite, for example, having a surface area of greater than or equal to about 5 $m^2/g$ to less than or equal to about 30 $m^2/g$ with an average diameter (D) or D50 that is less than or equal to about 8 micrometers (μm). A D50 means a cumulative 50% point of diameter (or 50% pass particle size) for the plurality of solid particles. Such a conductive graphite particle is commercially available as TIMCAL TIMREX® KS6 Synthetic Graphite. In yet other aspects, the electrically conductive particles distributed in the positive active layer may comprise both a carbon black conductive filler particle, like Super P™, and a carbon nanotube (CNT).

Each of the electrically conductive particles may be present at greater than or equal to about 0 wt. % to less than or equal to about 10 wt. %, optionally, greater than or equal to about 0.5 wt. % to less than or equal to about 10 wt. %, and in certain aspects, optionally greater than or equal to about 0 wt. % to less than or equal to about 0.5 wt. % or in alternative variations, optionally greater than or equal to about 1 wt. % to less than or equal to about 5 wt. % of a total weight of the positive active layer.

A cumulative amount of all electrically conductive particles in the positive active layer may be greater than or equal to about to about 0.5 wt. % to less than or equal to about 10 wt. %, and in certain aspects, optionally greater than or equal to about 1 wt. % to less than or equal to about 6 wt. %.

In one particular variation, the positive electrode or cathode may have a cathode active material comprising a first positive electroactive material of $LiMn_xFe_{1-x}PO_4$ (LMFP), where about 0.6≤x≤about 0.75. The LMFP electroactive particles may have an average diameter (D) or D50 that is less than or equal to about 12 micrometers (μm). The electroactive particles may have an average surface area of greater than or equal to about 12 $m^2/g$ to less than or equal to about 30 $m^2/g$ (BET). The LMFP electroactive particles may have a carbon coating disposed over the exterior surface (e.g., as a shell over the LMFP core), which may be greater than or equal to about 1 weight % to less than or equal to about weight 4% of a total electroactive particle weight. In certain variations, the LMFP electroactive particles have a specific capacity (mAh/g) at 1 C of greater than or equal to about 130 mAh/g to less than or equal to about 150 mAh/g.

In one particular variation, the positive electrode or cathode may have a cathode active material comprising a first positive electroactive material of $LiMn_2O_4$ (LMO). The LMO electroactive particles may have an average diameter (D) or D50 that is less than or equal to about 12 micrometers (μm) and a D95 of less than or equal to about 20 micrometers (μm). A D95 means a cumulative 95% point of diameter (or 95% pass particle size) for the plurality of solid particles. The electroactive particles comprising LMO may have an average surface an average surface area of greater than or equal to about 0.3 $m^2/g$ to less than or equal to about 1.2 $m^2/g$ BET using nitrogen ($N_2$). In certain variations, the LMO electroactive particles have a specific capacity (mAh/g) at 1 C of greater than or equal to about 95 mAh/g to less than or equal to about 105 mAh/g.

In one particular embodiment for a 12 V bipolar solid-state battery, the positive electrode has a positive active material that includes a first positive electroactive material comprising $LiMn_{0.7}Fe_{0.3}PO_4$ having a D50 of about 8.9 micrometers, a specific capacity at 1 C of about 147 mAh/g, and a surface area (BET) of about 14.8 $m^2/g$. The positive active material further includes a second positive electroactive material comprising $LiMn_2O_4$, having a D50 of about 8.4 micrometers, a specific capacity at 1 C of about 102 mAh/g, and a surface area (BET) of about 0.5 $m^2/g$.

In one variation, the positive active material may have a composition as follows. A first positive electroactive material comprising LMFP with the properties described above is present in the active material layer at greater than or equal to about 20 weight % to less than or equal to about 76 weight %. A second positive electroactive material comprising LMO with the properties described above is present in the active material layer at greater than or equal to about 20 weight % to less than or equal to about 76 weight %. The positive active layer further includes a solid-state electrolyte, such as $Li_{1+x+y}Al_xTi_{2-x}P_{3-y}O_{12}$ where 0≤x<2 and 0≤y<3 (LATP), present at greater than or equal to about 1 weight % to less than or equal to about 10 weight % of the total active material weight. The positive active layer also includes electrically conductive particles, including a carbon black conductive filler particle, like Super P™, present at greater than or equal to about 1 weight % to less than or equal to about 5 weight % of the total active material weight and a carbon nanotube (CNT) present at greater than 0 weight % to less than or equal to about 0.5 weight % of the total active material weight. The positive active layer also includes a polymeric binder, such as polyvinylidene difluoride (PVDF), present at greater than or equal to about 1 weight % to less than or equal to about 5 weight % of the total active material weight. In certain aspects, the precursors of these materials may be distributed in a slurry with a carrier or solvent and may have a viscosity of greater than or equal to about 1,500 to less than or equal to about 3,500 mPa·s (20 $s^{-1}$ at room temperature (approximately 21° C. (70° F.)).

The slurry can be mixed or agitated, and then applied to a substrate. The substrate can be a removable substrate or alternatively a functional substrate, such as a current collector (such as a metallic grid or mesh layer). In one variation, heat or radiation can be applied to evaporate the solvent from the active material film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the active material film that is then further laminated to a current collector. With either type of substrate, it may be necessary to extract or remove the remaining plasticizer prior to incorporation into the battery cell.

In certain variations, as will be discussed further below, the positive electrode current collector on which the composite active material layer may disposed may be in the form of a film or foil, such as a clad foil, a slit mesh, woven mesh, and the like. The positive current collector may comprise aluminum or any other suitable metal. The positive current collector can be connected to an external current collector tab.

A porosity of the composite active material layer, whether the positive or negative electrode after all processing is completed (including consolidation and calendering) may considered to be a fraction of void volume defined by pores over the total volume of the active material layer. The porosity may be greater than or equal to about 15% by volume to less than or equal to about 50% by volume, optionally greater than or equal to 20% by volume to less than or equal to about 40% by volume, and in certain variations, optionally greater than or equal to 25% by volume to less than or equal to about 35% by volume.

In one embodiment, a bipolar gel assisted solid-state battery has high power and is rated for 12V and a capacity of greater than or equal to about 24 mAh, optionally greater than or equal to about 50 Ah. Such a 12 V bipolar solid-state battery has a positive electrode including a positive active layer with a first positive electroactive material comprising LMFP at about 44 weight %, a second positive electroactive material comprising LMO at about 44 weight %, a solid-state electrolyte comprising LATP at about 5 weight %, a first electrically conductive particle comprising a carbon black particle (Super P™) present at about 3 weight %, and a polymeric binder comprising PVDF at about 4 weight %.

In certain fabrication processes, the polymer gel electrolyte is introduced into the electrodes after calendering. First, gel electrolyte precursor solutions containing the polymeric host, liquid electrolyte, and processing solvents will be applied (e.g., coated or sprayed) on the electrode surfaces so that the gel electrolyte precursor at least partially permeates into the pores of the electrode. PVDF-HFP is a particularly suitable polymeric host for the gel electrolyte. Then the processing solvents will be evaporated or removed to create the gel electrolyte.

A capacity loading of the positive electrode incorporating such an active material may be about 1.05±0.1 mAh/cm² (for one side coating, 1 C at room temperature). A pressing density of the positive electrode may be about 2.3±0.3 g/cm³ and a porosity of the active layer may be 30±5% by volume. An electrical conductivity of the positive active layer for the positive electrode may be represented by a resistance of less than or equal to about 2 Ω·cm. A moisture content may be less than or equal to about 600 ppm water.

The second electrode, whether the terminal second electrode or that disposed in the bipolar electrode has the second polarity opposite to the first polarity. The second electrode includes a second current collector and a second active layer. The second electrode may thus be a negative electrode. As discussed further below, the negative anode current collector may be a copper collector foil, which may be in the form of an open mesh grid or a thin film. The negative current collector can be connected to an external current collector tab.

The second active layer (e.g., on the bipolar electrode) includes a second or negative electroactive material (e.g., a plurality of second or negative electroactive material particles) that reversibly cycles lithium ions, and a second polymer gel electrolyte distributed therein. The second active layer may be calendared. Then, gel electrolyte precursors may be applied to the porous second active layer/second electrode in the same manner as described above for the first active layer/first electrode to form the gel electrolyte that at least partially fills the pores. The second or negative active layer may also include a second solid-state electrolyte (e.g., a plurality of solid-state electrolyte particles) distributed therein. The bipolar electrode assembly is oriented so that the second electrode with the second polarity faces the first terminal electrode with the opposite first polarity.

In various aspects, the negative electroactive material may be a plurality of solid-state electroactive particles. In certain variations, the active layer of the negative electrode may include a negative electroactive material such as graphite, lithium-silicon and silicon containing binary and ternary alloys and/or tin-containing alloys, such as Si—Sn, SiSnFe, SiSnAl, SiFeCo, $SnO_2$, lithium metal, alloys of lithium metal, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Alternatively, the negative electroactive material may be a layer of lithium metal or an alloy of lithium metal. In certain variations, the negative electroactive materials for the negative active layer of the negative electrode may be selected from the group consisting of: lithium, graphite, silicon, silicon-containing alloys, tin-containing alloys, lithium titanate, and combinations thereof. In certain aspects, the plurality of solid-state negative electroactive particles may comprise graphite.

In certain variations, the negative electrode may be a porous composite structure comprising negative electroactive particles and second solid-state electrolyte particles distributed with a polymeric binder matrix. The polymeric binder may be any of those described above in the context of the positive electrode. In certain variations, the binder comprises polyvinylidene difluoride (PVDF).

The pores of the porous composite structure of the negative electrode active layer may be at least partially filled with a polymeric gel electrolyte. In various aspects, the polymeric gel electrolyte may include any of the compositions described above in the context of the positive electrode.

The porous composite structure defining the negative active layer may also include an electrically conductive material, such as a plurality of electrically conductive particles distributed therein. Electrically conductive materials may include those described above in the context of the positive electrode, for example, carbon-based materials or a conductive polymer. In certain aspects, the electrically conductive particle comprises a carbon black, for example, electrically conductive carbon black is Super P™ carbon black conductive filler commercially available from Imerys Ltd. having a surface area of greater than about 63.5 m²/g (BET). In one variation, the electrically conductive material is a conductive graphite particle commercially available as TIMCAL TIMREX® KS6 Synthetic Graphite. In yet other aspects, the electrically conductive particles distributed in the negative active layer may comprise both a carbon black conductive filler particle, like Super P™, and a conductive graphite particle commercially available as TIMCAL TIMREX® KS6 Synthetic Graphite.

Each of the electrically conductive particles may be present at greater than or equal to about 0 wt. % to less than or equal to about 10 wt. %, optionally, greater than or equal to about 0 wt. % to less than or equal to about 10 wt. %, and in certain aspects, optionally greater than or equal to about 0.5 wt. % to less than or equal to about 3 wt. % of a total weight of the negative active layer.

A cumulative amount of all electrically conductive particles in the negative active layer may be greater than or equal to about to about 0.5 wt. % to less than or equal to about 10 wt. %, and in certain aspects, optionally greater than or equal to about 1 wt. % to less than or equal to about 6 wt. %.

In one particular variation, the negative electrode or anode may have an anode active material comprising a negative electroactive material of graphite. The graphite electroactive particles may have an average diameter (D) or D50 that is less than or equal to about 16 micrometers (µm). The electroactive particles comprising graphite may have an average surface of less than or equal to about 5 m$^2$/g BET using nitrogen ($N_2$). In certainvariations, the graphite elegy electroactiveparticles have: a specific capacity (mAh/g) at 1 C of greater than or equal to about 335 mAh/g to less than or equal to about 350 mAh/g.

In one particular embodiment for a 12 V bipolar solid-state battery, the negative electrode has a negative active material that includes a negative electroactive material comprising graphite having a D50 of about 5.5 micrometers, a specific capacity at 1 C of about 335 mAh/g, and a surface area (BET) of less than about 3.4 m$^2$/g.

In one variation, the negative active material may have a composition as follows. A negative electroactive material comprising graphite with the properties described above is present in the active material layer at greater than or equal to about 85 weight % to less than or equal to about 95 weight %. The negative active layer further includes a solid-state electrolyte, such as $Li_{7-x}La_3Zr_{2-x}M_xO_{12}$ (LLZO) where M is a metal selected from tantalum (Ta), niobium (Nb), bismuth (Bi), tin (Sn), and the like, where 0≤x<2, present at greater than or equal to about 1 weight % to less than or equal to about 10 weight % of the total active material weight. The negative active layer also includes electrically conductive particles, including a carbon black conductive filler particle, like Super P™, present at greater than or equal to about 1 weight % to less than or equal to about 3 weight % of the total active material weight and a conductive graphite particle, like TIMCAL TIMREX® KS6 graphite, present at greater than or equal to 0 weight % to less than or equal to about 3 weight % of the total active material weight. The negative active layer also includes a polymeric binder, such as polyvinylidene difluoride (PVDF), present at greater than or equal to about 2 weight % to less than or equal to about 6 weight % of the total active material weight. In certain aspects, the precursors of these materials may be distributed in a slurry with a carrier or solvent and may have a viscosity of greater than or equal to about 1,500 to less than or equal to about 2,500 mPa·s (20 s$^{-1}$ at room temperature (approximately 21° C. (70° F.)).

Much like the positive electrode slurry, the negative electrode slurry can be applied to a substrate and processed in the same manner described above and the composite electrode may have the same porosity levels described above in the context of the positive electrode.

In one embodiment, a 12 V bipolar solid-state battery has a negative electrode including a negative active layer with a negative electroactive material comprising graphite at about 93 weight %, a solid-state electrolyte comprising LLZO at about 3 weight %, a first electrically conductive particle comprising a carbon black particle (e.g., Super P™) present at about 1 weight %, a second electrically conductive particle comprising a graphite particle (e.g., KS6) present at about 2 weight %, and a polymeric binder comprising PVDF at about 4 weight %. The negative active layer may be calendared. Then, gel electrolyte precursors may be applied to the porous negative active layer in the same manner as described above. For example, the gel electrolyte precursor solutions containing the polymeric host, liquid electrolyte, and processing solvents will be applied (e.g., coated or sprayed) on the electrode surfaces so that the gel electrolyte precursor at least partially permeates into the pores of the electrode. PVDF-HFP is a particularly suitable polymeric host for the gel electrolyte. Then the processing solvents will be evaporated or removed to create the gel electrolyte.

A capacity loading of the negative electrode incorporating such an active material may be about 1.15±0.1 mAh/cm$^2$ (for one side coating, 1 C at room temperature). A pressing density of the negative electrode may be about 1.6±0.2 g/cm$^3$ and a porosity of the active layer may be 36±8% by volume. An electrical conductivity of the negative active layer for the negative electrode may be represented by a resistance of less than or equal to about 2 Ω·cm. A moisture content may be less than or equal to about 500 ppm water.

For example, in one variation, a one-side capacity loading on a current collector in the bipolar component is about 1.15 mAh/cm$^2$ (1 C at room temperature) and a pressing density may be about 1.6 g/cm$^3$.

As noted above, the least one bipolar electrode assembly includes both a first current collector with a first polarity and a second current collector with a second polarity opposite from the first. By way of example, the first polarity may be a positive polarity and the second polarity may be a negative polarity. In the bipolar electrode assembly, the positive or first current collector may be a foil of aluminum. Further, the aluminum may include a carbon coating that is adjacent to the active layer. The second current collector or negative current collector may be a copper film or layer. In certain aspects, the metal layer for the positive or negative current collector together may have a combined thickness of greater than or equal to about 6 micrometers to less than or equal to about 30 micrometers. In one variation, aluminum foil may be clad over a layer of copper. In another variation, a copper film may be clad over a layer of aluminum. For the positive current collector, the carbon coating may be greater than or equal to about 0.1 micrometers to less than or equal to about 3 micrometers. In a 12 V bipolar solid-state battery, the bipolar electrode assembly may have a clad foil of aluminum and copper with a thickness of about 25 micrometers. The aluminum has a carbon coating with a thickness of about 2 micrometers.

As noted above, the battery includes multiple free-standing polymeric gel separator layers or membranes that may be disposed between each bipolar electrode assembly and/or between one bipolar electrode and a respective terminal electrode. The polymeric gel-separator layer may be formed of a polymer that forms a gel, in which a liquid electrolyte (e.g., solvents) and optionally one or more lithium salts may be distributed. The polymeric gel-separator layer may be formed of a material similar to the polymeric gel electrolyte described above; however, provides a structural integrity and strength, such that it is freestanding. In various aspects, the polymer may comprise polyacrylonitrile (PAN). Further, the polymeric gel-separator layer may include the liquid electrolyte as described above in the context of the polymeric gel electrolyte, including solvents and lithium salt(s) previously described. The polymer may be present at greater than 0 wt. % to less than or equal to about 20 wt. %, optionally greater than or equal to about 10 wt. % to less than or equal to about 15 wt. % of the total weight of the polymeric gel separator layer The polymeric gel-separator layer may have a liquid electrolyte distributed with the polymer, which when imbibed in the polymeric gel is a semi-solid or non-flowing gel phase. The lithium salt may include bis(trifluoromethanesulfonyl)imide (LiTFSI), lithium bis(fluorosulfony)imide (LiFSI), lithium bis(oxalato)borate (LiBOB), lithium tetrafluoroborate (LiBF$_4$), and combinations thereof. In certain variations, the lithium salt may include both bis(trifluoromethanesulfonyl)imide (LiTFSI) and lithium tetrafluoroborate (LiBF$_4$). Each lithium salt may be present at greater than or equal to about 0.001 M to less than or equal to about 1 M, optionally at greater than or equal to about 0.01 M to less than or equal to about 0.75 M, optionally greater than or equal to about 0.3 M to less than or equal to about 0.6 M, optionally about 0.4 M in the liquid electrolyte.

A cumulative amount of all lithium salt(s) present in the liquid electrolyte may be greater than or equal to about 0.1 M to less than or equal to about 2M, optionally at greater than or equal to about 0.4 M to less than or equal to about 1.5 M, optionally greater than or equal to about 0.6 M to less than or equal to about 1.2 M, and in certain aspects, optionally about 0.8 M in the liquid electrolyte.

By way of example, in one variation, the liquid electrolyte may include greater than or equal to about 0.3M to less than or equal to about 0.6M of LITFSI and greater than or equal to about 0.3M to less than or equal to about 0.6M of LiBF$_4$. In one variation, the liquid electrolyte may include 0.4M of LITFSI and 0.4 M LiBF$_4$.

One or more solvents in the liquid electrolyte may be those described above in the context of the polymeric gel electrolyte. For example, the solvent may be selected from the group consisting of: ethylene carbonate (EC), γ-butyrolactone/gamma-butyrolactone (GBL), and combinations thereof. In certain variations, the solvent comprises both ethylene carbonate (EC) and γ-butyrolactone/gamma-butyrolactone (GBL).

A total amount of solvent may be present in the liquid electrolyte at greater than or equal to about 75 wt. % to less than about 90 wt. %, optionally greater than or equal to about 80 wt. % to less than or equal to about 90 wt. %, optionally greater than or equal to about 85 wt. % to less than or equal to about 90 wt. %, for example, at about 87 wt. % of the total weight of the liquid electrolyte.

In certain aspects, two solvents may be included in the liquid electrolyte, ethylene carbonate (EC) and γ-butyrolactone/gamma-butyrolactone (GBL). A mass ratio of a first solvent, such as a carbonate solvent, like EC to a second solvent, such as a lactone solvent, like GBL, may be greater than or equal to about 1:1 to less than or equal to about 1:2, such as for example, about 1:1.5 (or 4:6). In other variations, a ratio of EC:GBL may range between about 8:2 (4:1) to about 3:7 (1:2.3). The ratio of EC:GBL in the free-standing gel electrolyte layer electrolyte may be the same ratio as the ratio of EC to GBL in the gel electrolyte in the electrodes.

For example, in certain variations, the liquid electrolyte may include greater than or equal to about 75 wt. % to less than or equal to about 90 wt. %, and in certain aspects, optionally greater than or equal to about 80 wt. % to less than or equal to about 90 wt. % of a total amount of lithium salts, and greater than or equal to about 85 wt. % to less than or equal to about 90 wt. %, and in certain aspects, optionally greater than or equal to about 86 wt. % to less than or equal to about 90 wt. % of a total amount of the solvents.

By way of example, in one variation, the liquid electrolyte for the free-standing polymeric gel separator layer may include 0.4 M LITFSI and 0.4 M LiBF$_4$ in a solvent comprising ethylene carbonate (EC) and gamma-butyrolactone (GBL) at a weight ratio of about 4:6.

In certain variations, the polymeric gel electrolyte may further include a conventional additive. For example, the non-volatile gel may include greater than 0 wt. % to less than or equal to about 10 wt. % of the additive.

The free-standing polymeric gel separator layer may have a thickness of greater than or equal to about 10 micrometers to less than or equal to about 50 micrometers, optionally greater than or equal to about 25 micrometers to less than or equal to about 50 micrometers, greater than or equal to about 35 micrometers to less than or equal to about 45 micrometers, for example, about 40 micrometers. The free-standing polymeric gel separator layer may be porous, but has comparatively lower porosity than a conventional polyolefin separator.

The blocker composition may be a composite that includes a polymer material and an inorganic filler distributed therein. The polymer may be present at greater than or equal to about 60 weight % to less than or equal to about 100 weight % of the total blocker material weight and the inorganic material may be present at greater than or equal to about 0 weight % to less than or equal to about 40 weight % of the total blocker material weight. The polymer may be selected from hot-melt adhesives, such as polyolefin resin (e.g., polypropylene, polyethylene, and the like), urethane resin, polyamide resin, epoxy resin, combinations and equivalents thereof. The inorganic filler material may include silicon dioxide ($SiO_2$), aluminum oxide ($Al_2O_3$), zirconium oxide ($ZrO_2$), aluminum oxide hydroxide (γ-AlOOH), titanium dioxide ($TiO_2$), and any combinations thereof. In one 12 V gel-assisted bipolar solid-state battery, the blocker composition may comprise about 90 weight % of a polyolefin and about 10 weight % of aluminum oxide ($Al_2O_3$) particles.

The precursor of the blocker composition may be further reacted (e.g., cured or crosslinked), for example, by exposing the layer to heat, actinic (e.g., UV) radiation, and the like.

The gel-assisted battery prepared in accordance with various aspects of the present disclosure may have a capacity ratio (e.g., areal capacity) of negative electrode to positive electrode (N/P ratio) of greater than or equal to about 1 to less than or equal to about 1.15, optionally greater than or equal to about 1.05 to less than or equal to about 1.1, optionally about 1.09 in certain variations.

A positive electrode in the bipolar electrode assembly may have dimensions of about 50 mm by about 52 mm, while a negative electrode may have dimensions of about 52 mm by about 57 mm in one variation.

EXAMPLES

Example 1

A 12 V, 24 mA/h cell is prepared as follows. A cell having a bipolar electrode with a positive electrode/cathode having 44 weight % $LiMn_{0.7}Fe_{0.3}PO_4$ (D50 of 8.9 capacity of 147 mAh/g (1 C), BET: 14.8 m$^2$/g), 44 weight % $LiMn_2O_4$ (D50 of 8.4 capacity of 102 mAh/g (1 C), BET: 0.5 m$^2$/g), 5 weight % LATP solid-state electrolyte, 3 weight % Super P™ conductive carbon black particles, and 4 weight % PVDF binder is prepared. The slurry is cast on an aluminum clad copper foil current collector assembly having a thickness of 25 where the aluminum further includes a 2 μm thick carbon coating. All the components are mixed together in NMP solvent to form a slurry and the amount of solvent is adjusted to result in a solid content of about 45%. Then the slurry was coated on the current collector surfaces followed by heat treatment and calendering.

After processing, the cathode has one-side capacity loading of 1.05 mAh/cm$^2$ (for one side coating, 1 C at room temperature) and a pressing density of about 2.2 g/cm$^3$. The size of the positive electrode/cathode is about 50 mm×52 mm.

For bipolar electrodes, two steps are needed for forming the cathode and then the anode on the bipolar electrode, respectively.

The negative electrode is disposed over the bipolar current collector assembly over the copper. The negative electrode/anode has 93 weight % graphite (D50 of 5.5 µm, 335 mAh/g (1 C), BET<3.4 m$^2$/g), 3 weight % LLZO solid-state electrolyte, 1 weight % Super P™ conductive carbon black particles, 2 weight % KS6™ conductive graphite particles, and 4 weight % PVDF binder. All the components are mixed together in NMP solvent to form a slurry and the amount of solvent is adjusted to result in a solid content of about 45%. Then the slurry was coated on the current collector surfaces followed by heat treatment and calendering.

After processing, the anode has one-side capacity loading of 1.15 mAh/cm$^2$ (for one side coating, 1 C at room temperature) and a pressing density of about 1.6 g/cm$^3$. The size of the negative electrode/anode is about 52 mm×57 mm.

The terminal electrodes are single-coated on a current collector, using the same processes described above for the anode and cathode of the bipolar electrode. When the terminal electrodes are slit or cut into pieces after the formation process, each terminal electrode will have a tab to ensure the terminal electrodes can connect with external tabs by welding, while bipolar electrodes do not require such tabs.

Next, a gel electrolyte having a composition of 5 weight % PVDF-HFP and 95 weight % liquid electrolyte is introduced into the pores of the calendared electrodes. The liquid electrolyte has the following composition: 0.4 M LITFSI, 0.4 M LiBF$_4$ in EC/GBL=4:6 and 2.5 wt. % or 0.18 M of LiBOB. Free-standing gel membranes with an average thickness of about 40 µm are formed with 13 weight % polyacrylonitrile (PAN) and 87 weight % liquid electrolyte having 0.4 M LiTFSI and 0.4 M LiBF$_4$ in ethylene carbonate (EC)/γ-butyrolactone (GBL) at a 4:6 (w/w). The gel membrane layer is made by hot-casting where all the components were mixed and heated to around 150° C. Then the melted solutions are coated on the substrate followed by natural cooling process at ambient conditions. The substrate over which the melted material is applied can be stainless steel. After the gel electrolyte is cooled, it can be removed from the stainless steel. Then the free-standing gel membrane can be disposed adjacent to the surface of electrodes. A first free-standing gel membrane is disposed between the positive electrode of the bipolar electrode assembly and a terminal negative electrode (having the same negative electrode active material composition described above disposed on a copper current collector) and a second free-standing gel membrane is disposed between the negative electrode of the bipolar electrode assembly and a terminal positive electrode (having the same positive electrode active material composition described above disposed on an aluminum current collector).

After assembly of the layers into a stack, a precursor of a blocker component is applied to terminal ends of the stack (permitting the tabs of the current collectors to protrude). The blocker composition has 90 weight % polyolefin and 10 weight % Al$_2$O$_3$.

The battery cell formed has an N/P ratio of about 1.09.

Example 2

Figure 2:
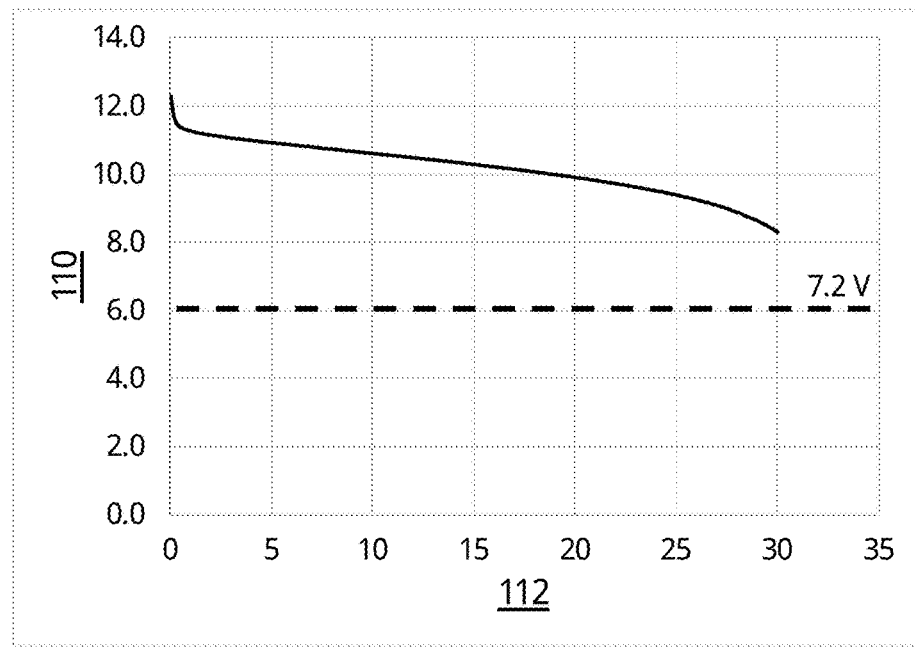
FIG. 2 shows cold-cranking capabilities of a test cell in the form of a gel-assisted high power stack prepared in accordance with certain aspects of the present disclosure with voltage versus time (having a minimum voltage capability of 7.2V shown).

A 12V, 24 mAh battery cell like that formed in Example 1 is tested for cold crack performance. The cold cranking conditions are −18° C., 80 state of charge (SOC), 10 C pulse. Results of this test are shown in FIG. 2, where cold cranking performance is shown as voltage (V) labeled 110 versus time (seconds) 112. The battery exhibits excellent cranking capability, well above a target of 7.2 V, even after 30 seconds at 10 Coulombs (C) pulse.

Example 3

Figure 3A:
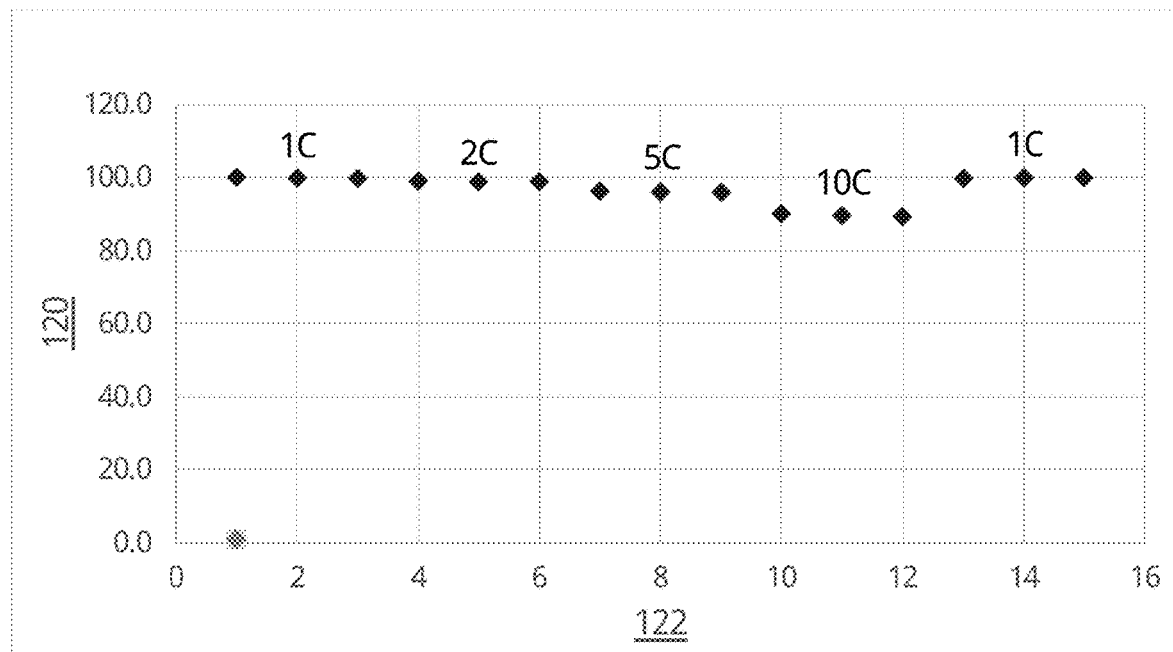
FIGS. 3A-3C show performance capabilities of a test cell in the form of a gel-assisted high power stack prepared in accordance with certain aspects of the present disclosure.
Figure 3B:
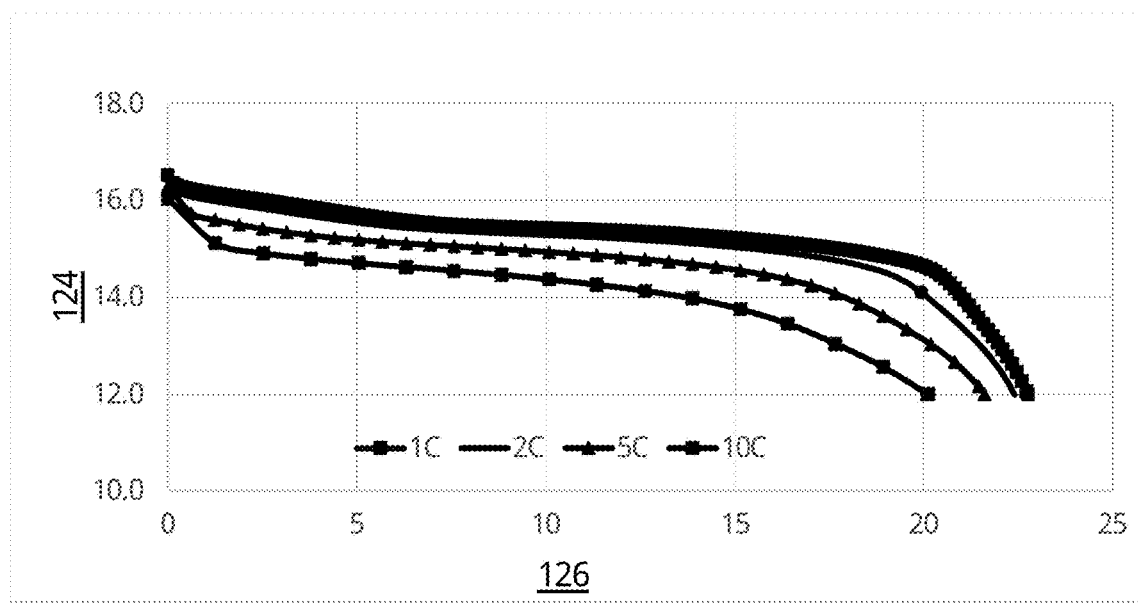
Figure 3C:
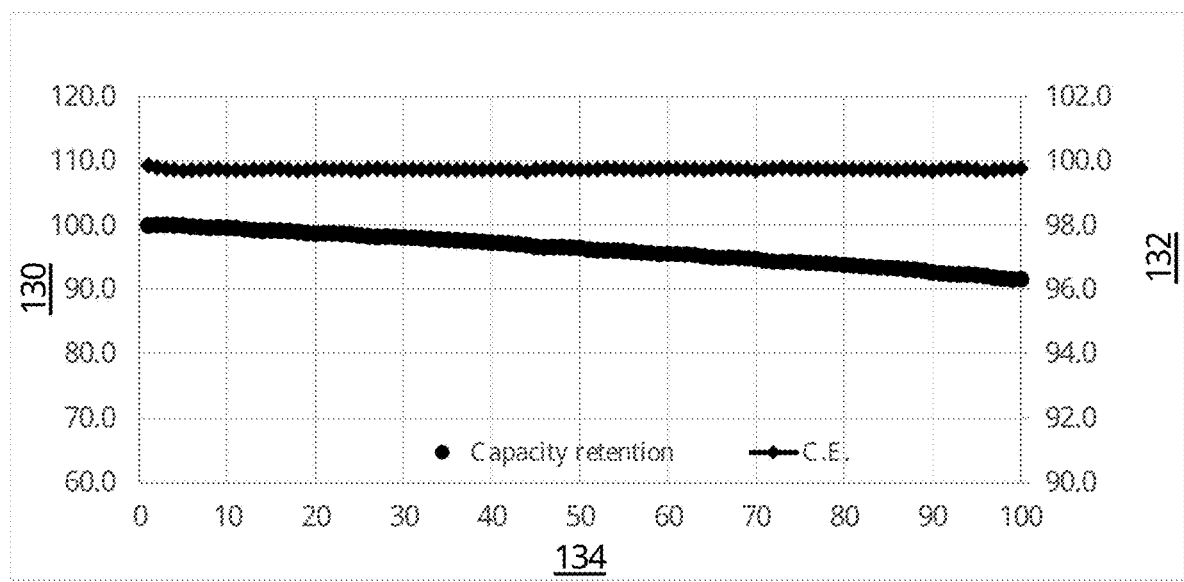

Discharge rate performance for a 12V, 24 mAh battery cell like that formed in Example 1 is tested in this example. FIGS. 3A-3B show discharge rate performance at charging of 1 Coulomb (C) and discharging at 1 C, 2 C, 5 C, and 10 C. FIG. 3A shows capacity retention (%) as 120 versus cycle number 122. FIG. 3B shows discharge rate curves of Voltage (V) as 124 versus Capacity (mAh) 126. Lastly, FIG. 3C shows cycling performance of the battery cell at 25° C. at 1 C rate. Capacity retention (%) 130, and Coulomb Efficiency (CE—%) 132 are plotted versus cycle number 134. FIGS. 3A-3C show superior discharge rate capability of greater than 88% capacity retention at 10 C. Further, the battery cell in this example shows remarkable cycling capability of greater than 90% capacity retention after 100 cycles.

Example 4

Figure 4A:
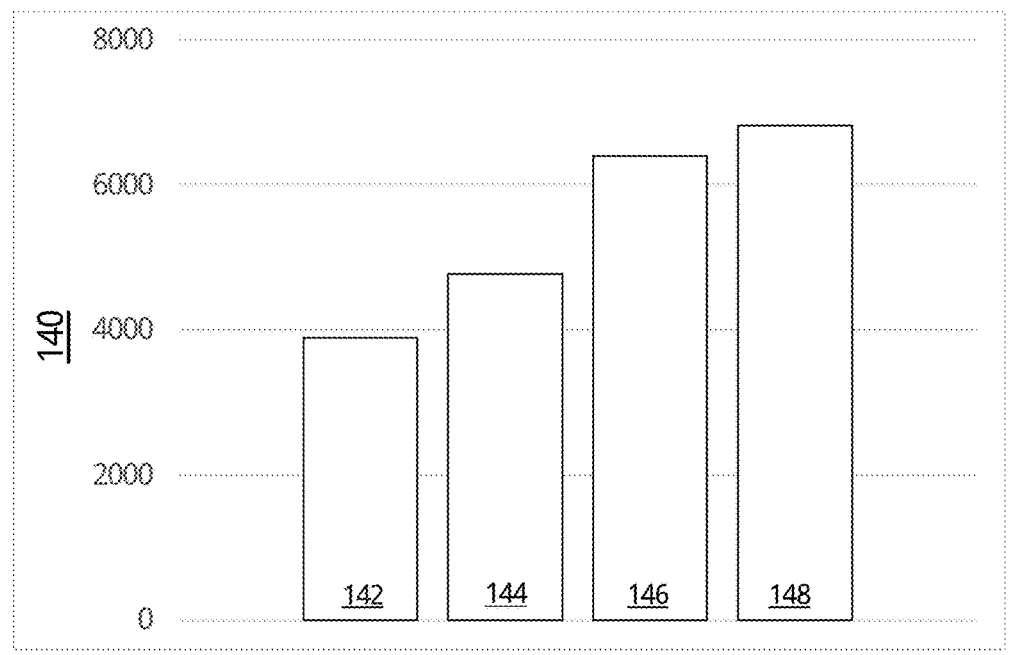
FIGS. 4A-4B show high temperature performance of a test cell, a gel-assisted high power stack prepared in accordance with certain aspects of the present disclosure.
Figure 4B:
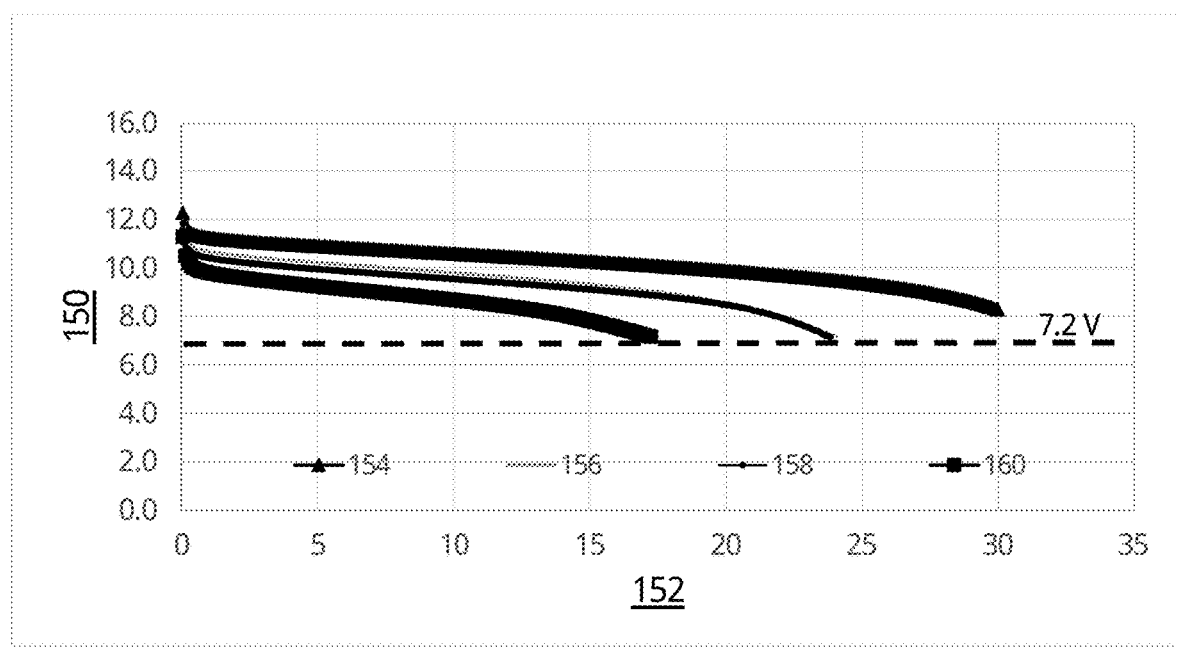

This example tests high temperature performance of a 12V, 24 mAh battery cell like that formed in Example 1. The testing is conducted at 45° C. with 1.5 C cycles about 60 to 80 SOC. FIG. 4A shows direct current resistance (DCR—mOhms) 140 for a pristine battery 142, a battery after 510 cycles 144, a battery after 1,530 cycles 146, and a battery after 2,040 cycles 148. FIG. 4B shows cranking before and after cycles at 45° C. Voltage (V) 150 versus time (seconds) 152 are shown for a pristine battery 154, a battery after 510 cycles 156, a battery after 1,530 cycles 158, and a battery after 2,040 cycles 160. FIGS. 4A-4B demonstrate good high-temperature durability: far past the cranking requirements even after 2,040 cycles at 45° C. and above 7.2 V threshold.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A high-power gel-assisted battery stack that cycles lithium ions comprising:
    a first terminal electrode having a first polarity;
    a second terminal electrode having a second polarity opposite from the first polarity;
    at least one bipolar electrode assembly disposed between the first terminal electrode and the second terminal electrode, the at least one bipolar electrode assembly having a first electrode with the first polarity disposed on a first side of a bipolar current collector and a second electrode with the second polarity opposite to the first polarity disposed on a second side of the bipolar current collector,
wherein the first electrode comprises;
a first porous layer comprising:
a first electroactive material that reversibly cycles lithium ions; and
a first solid state electrolyte disposed in a first polymeric binder, and
a first polymer gel electrolyte distributed in pores of the first porous layer,
wherein the first electrode has a capacity loading of about 1.05±0.1 mAh/cm$^2$, a pressing density of about 2.3±0.3 g/cm$^3$, and a moisture content less than or equal to about 600 ppm water, and
wherein the second electrode comprises;
a second porous layer comprising:
a second electroactive material that reversibly cycles lithium ions; and
a second solid state electrolyte disposed in a second polymeric binder, and
a second polymer gel electrolyte distributed in pores of the second porous layer,
wherein the second electrode has a capacity loading of about 1.15±0.1 mAh/cm$^2$, a pressing density of about 1.6±0.2 g/cm$^3$, and a moisture content less than or equal to about 500 ppm water; and
at least two free-standing gel separator layers,
wherein each of the at least two free-standing gel separator layers is disposed between the at least one bipolar electrode assembly and the first terminal electrode or between the at least one bipolar electrode assembly and the second terminal electrode, and
wherein each of the at least two free-standing gel separator layers comprises polyacrylonitrile (PAN) and a first electrolyte distributed therein,
wherein the high-power gel-assisted battery has a maximum voltage rating of greater than or equal to about 12V.

2. The high-power gel-assisted battery stack of claim 1, wherein at least one of the first electrode or the second electrode further comprises:
an electrically conductive particles distributed in the first porous layer or the second porous layer,
wherein each electrically conductive particle is independently selected from the group consisting of: carbon black, carbon fibers, carbon nanotubes, graphene, graphene oxide, graphite, acetylene black, and combinations thereof.

3. The high-power gel-assisted battery stack of claim 1, wherein
the first electrode is a positive electrode and the first electroactive material is selected from the group consisting of: LiMn$_2$O$_4$ (LMO), LiMn$_x$Fe$_{1-x}$PO$_4$ (LMFP), where x ranges from about 0.6 to about 0.75, and combinations thereof, and
the first solid-state electrolyte is selected from the group consisting of: Li$_{7-x}$La$_3$Zr$_{2-x}$M$_x$O$_{12}$ (LLZO) where M is a metal selected from tantalum (Ta), niobium (Nb), bismuth (Bi), and tin (Sn), the like, where 0≤x<2; Li$_x$La$_y$TiO$_3$ (LLTO) where 0<x<1 and 0<y<1; Li$_{1+x+y}$Al$_x$Ti$_{2-x}$P$_{3-y}$O$_{12}$ where 0≤x<2 and 0≤y<3 (LATP); Li$_{2+2x}$Zn$_{1-x}$GeO$_4$ where 0<x<1 (LISICON); Li$_2$PO$_2$N (LIPON); Li$_x$La$_{2/3-x}$TiO$_3$ where 0<x<2/3; Li$_{1+x}$Al$_x$Ti$_{2-x}$(PO$_4$)$_3$ where 0≤x<2; and combinations thereof.

4. The high-power gel-assisted battery stack of claim 1, wherein
the first electroactive material comprises both LiMn$_2$O$_4$ (LMO) and LiMn$_x$Fe$_{1-x}$PO$_4$ (LMFP), where x ranges from about 0.6 to about 0.75 with a carbon coating disposed thereon,
the first porous layer comprises greater than or equal to about 20 weight % to less than or equal to about 76 weight % of LMO and greater than or equal to about 20 weight % to less than or equal to about 76 weight % LMFP, and
the first solid-state electrolyte comprises Li$_{1+x+y}$Al$_x$Ti$_{2-x}$P$_{3-y}$O$_{12}$ where 0≤x<2 and 0≤y<3 (LATP).

5. The high-power gel-assisted battery stack of claim 1, wherein
both the first polymer gel electrolyte and the second polymer gel electrolyte independently comprises a polymeric host and a second electrolyte,
the second electrolyte comprises a lithium salt, ethylene carbonate (EC), and γ-butyrolactone (GBL),
the polymeric host is selected from the group consisting of: polyvinylidene fluoride (PVDF), polyvinylidene fluoride-hexafluoropropylene (PVDF-HFP), and combinations thereof,
the lithium salt is selected from the group consisting of: lithium bis(trifluoromethanesulfonyl)imide (LiTFSI), lithium bis(oxalato)borate (LiBOB), lithium tetrafluoroborate (LiBF$_4$), and combinations thereof, and
a ratio of EC to GBL is greater than or equal to about 1:1 to less than or equal to about 1:1.5.

6. The high-power gel-assisted battery stack of claim 5, wherein the first polymer gel electrolyte and the second polymer gel electrolyte each comprises greater than 0 weight % to less than or equal to about 10 weight % of the polymeric host and greater than or equal to about 90 weight % to less than about 100 weight % of the second electrolyte.

7. The high-power gel-assisted battery stack of claim 1, wherein the first electrolyte comprises:
a lithium salt selected from the group consisting of: lithium bis(trifluoromethanesulfonyl)imide (LiTFSI), lithium tetrafluoroborate (LiBF$_4$), and combinations thereof,
ethylene carbonate (EC), and
γ-butyrolactone (GBL),
a ratio of EC to GBL being greater than or equal to about 1:1 to less than or equal to about 1:1.5.

8. The high-power gel-assisted battery stack of claim 7, wherein each of the at least two free-standing gel separator layers includes greater than or equal to about 10 weight % to less than or equal to about 15 weight % polyacrylonitrile (PAN) and greater than or equal to about 75 weight % to less than or equal to about 90 weight % of the first electrolyte.

9. The high-power gel-assisted battery stack of claim 1, wherein the high-power gel-assisted battery stack has having a negative to positive areal ratio of greater than or equal to about 1 to less than or equal to about 1.15.

10. The high-power gel-assisted battery stack of claim 1, wherein
the second electrode is a negative electrode,
the second electroactive material comprises graphite, and the second solid-state electrolyte comprises $Li_{7-x}La_3Zr_{2-x}M_xO_{12}$ (LLZO) where M is a metal selected from tantalum (Ta), niobium (Nb), bismuth (Bi), and tin (Sn), where $0 \le x < 2$.

11. A high-power gel-assisted battery stack that cycles lithium ions comprising:
   at least one bipolar electrode assembly disposed between a terminal positive electrode and a terminal negative electrode,
      the at least one bipolar electrode assembly having a positive electrode disposed on a first side of a bipolar current collector and a negative electrode disposed on a second side of the bipolar current collector,
      wherein the positive electrode comprises:
         a first porous composite layer comprising:
            a first polymeric binder;
            a first electroactive material selected from the group consisting of: $LiMn_2O_4$ (LMO), $LiMn_xFe_{1-x}PO_4$ (LMFP), where x ranges from about 0.6 to about 0.75, and combinations thereof;
            a first solid state electrolyte comprising $Li_{1+x+y}Al_xTi_{2-x}P_{3-y}O_{12}$ where $0 \le x < 2$ and $0 \le y < 3$ (LATP); and
            a first electrically conductive particle, and
         a first polymer gel electrolyte distributed in pores of the first porous composite layer,
         wherein the first porous composite layer comprises greater than or equal to about 20 weight % to less than or equal to about 76 weight % of LMO and greater than or equal to about 20 weight % to less than or equal to about 76 weight % LMFP, and
      wherein the positive electrode has a capacity loading of about 1.05±0.1 mAh/cm², a pressing density of about 2.3±0.3 g/cm³, and a moisture content less than or equal to about 600 ppm water, and
      wherein the negative electrode comprises:
         a second porous composite layer comprising:
            a second polymeric binder;
            a second electroactive material comprising graphite;
            a second solid state electrolyte comprising $Li_{7-x}La_3Zr_{2-x}M_xO_{12}$ (LLZO) where M is a metal selected from tantalum (Ta), niobium (Nb), bismuth (Bi), and tin (Sn), where $0 \le x < 2$; and
            a second electrically conductive particle, and
         a second polymer gel electrolyte distributed in pores of the second porous composite layer,
         wherein the negative electrode has a capacity loading of about 1.15±0.1 mAh/cm², a pressing density of about 1.6±0.2 g/cm³, and a moisture content less than or equal to about 500 ppm water; and
   at least two free-standing gel separator layers,
      wherein each respective gel separator layer is disposed between the at least one bipolar electrode assembly and the terminal positive electrode and the at least one bipolar electrode assembly and the terminal negative electrode,
      wherein each respective free-standing gel separator layer comprises polyacrylonitrile (PAN) and a first electrolyte distributed therein,
   wherein the high-power gel-assisted battery has a maximum voltage rating of greater than or equal to about 12V.

12. The high-power gel-assisted battery stack of claim 11, wherein both the first polymer gel electrolyte and the second polymer gel electrolyte independently comprises a polymeric host and a second electrolyte,
the second electrolyte comprises a lithium salt, ethylene carbonate (EC), and γ-butyrolactone (GBL),
the polymeric host is selected from the group consisting of: polyvinylidene fluoride (PVDF), polyvinylidene fluoride-hexafluoropropylene (PVDF-HFP), and combinations thereof,
the lithium salt is selected from the group consisting of: lithium bis(trifluoromethanesulfonyl)imide (LiTFSI), lithium bis(oxalato)borate (LiBOB), lithium tetrafluoroborate ($LiBF_4$), and combinations thereof, and
a ratio of EC to GBL is greater than or equal to about 1:1 to less than or equal to about 1:1.5.

13. The high-power gel-assisted battery stack of claim 12, wherein the second electrolyte comprises greater than 0 weight % to less than or equal to about 10 weight % of the polymeric host and greater than or equal to about 90 weight % to less than about 100 weight % of the second electrolyte.

14. The high-power gel-assisted battery stack of claim 11, wherein the first electrolyte comprises;
   a lithium salt selected from the group consisting of: lithium bis(trifluoromethanesulfonyl)imide (LiTFSI), lithium tetrafluoroborate ($LiBF_4$), and combinations thereof,
   ethylene carbonate (EC), and
   γ-butyrolactone (GBL),
   a ratio of EC to GBL being greater than or equal to about 1:1 to less than or equal to about 1:1.5.

15. The high-power gel-assisted battery stack of claim 14, wherein each of the free-standing gel separator layers has greater than or equal to about 10 weight % to less than or equal to about 15 weight % polyacrylonitrile (PAN) and greater than or equal to about 75 weight % to less than or equal to about 90 weight % of the first electrolyte.

16. The high-power gel-assisted battery stack of claim 11, wherein the high-power gel-assisted battery stack has a negative to positive areal ratio of greater than or equal to about 1 to less than or equal to about 1.15.

17. A high-power gel-assisted battery stack that cycles lithium ions comprising:
   at least one bipolar electrode assembly disposed between a terminal positive electrode and a terminal negative electrode,
      the at least one bipolar electrode assembly having a positive electrode disposed on a first side of a bipolar current collector and a negative electrode disposed on a second side of the bipolar current collector,
      wherein the positive electrode comprises:
         a first porous composite layer comprising:
            a first polymeric binder;
            a first electroactive material selected from the group consisting of: $LiMn_2O_4$ (LMO), $LiMn_xFe_{1-x}PO_4$ (LMFP), where x ranges from about 0.6 to about 0.75, and combinations thereof;
            a first solid state electrolyte comprising $Li_{1+x+y}Al_xTi_{2-x}P_{3-y}O_{12}$ where $0 \le x < 2$ and $0 \le y < 3$ (LATP); and
            a first electrically conductive particle, and
         a first polymer gel electrolyte distributed in pores of the first porous composite layer,
         wherein the positive electrode has a capacity loading of about 1.05±0.1 mAh/cm², a pressing density of about 2.3±0.3 g/cm$^3$, and a moisture content less than or equal to about 600 ppm water, and
wherein the negative electrode comprises:
a second porous composite layer comprising:
a second polymeric binder;
a second electroactive material comprising graphite;
a second solid state electrolyte comprising Li$_{7-x}$La$_3$Zr$_{2-x}$M$_x$O$_{12}$ (LLZO) where M is a metal selected from tantalum (Ta), niobium (Nb), bismuth (Bi), and tin (Sn), where 0≤x<2; and
a second electrically conductive particle, and
a second polymer gel electrolyte distributed in pores of the second porous composite layer,
wherein the negative electrode has a capacity loading of about 1.15±0.1 mAh/cm$^2$, a pressing density of about 1.6±0.2 g/cm$^3$, and a moisture content less than or equal to about 500 ppm water;
at least two free-standing gel separator layers,
wherein each respective gel separator layer is disposed between the at least one bipolar electrode assembly and the terminal positive electrode and the at least one bipolar electrode assembly and the terminal negative electrode,
wherein each respective free-standing gel separator layer comprises polyacrylonitrile (PAN) and a first electrolyte distributed therein;
a blocker composite composition disposed along terminal edges of the at least one bipolar electrode assembly and the at least two free-standing gel separator layers,
the blocker composite composition comprising a polymeric matrix with a plurality of inorganic particles distributed therein,
wherein the high-power gel-assisted battery has a negative to positive areal ratio of greater than or equal to about 1 to less than or equal to about 1.15, a maximum voltage rating of greater than or equal to about 12V, and a capacity of greater than or equal to about 24 mAh.

18. The high-power gel-assisted battery stack of claim 17, wherein
the first electroactive material comprises both LiMn$_2$O$_4$ (LMO) and LiMn$_x$Fe$_{1-x}$PO$_4$ (LMFP), where x ranges from about 0.6 to about 0.75, with a carbon coating disposed thereon,
the first porous composite layer comprises greater than or equal to about 20 weight % to less than or equal to about 76 weight % of LMO and greater than or equal to about 20 weight % to less than or equal to about 76 weight % LMFP,
the first solid-state electrolyte comprises Li$_{1+x+y}$Al$_x$Ti$_{2-x}$P$_{3-y}$O$_{12}$ where 0≤x<2 and 0≤y<3 (LATP),
the first polymer gel electrolyte and the second polymer gel electrolyte independently comprises a polymeric host and a second electrolyte,
the second electrolyte comprises a lithium salt, ethylene carbonate (EC), and γ-butyrolactone (GBL), wherein
the polymeric host is selected from the group consisting of: polyvinylidene fluoride (PVDF), polyvinylidene fluoride-hexafluoropropylene (PVDF-HFP), and combinations thereof,
the lithium salt is selected from the group consisting of: lithium bis(trifluoromethanesulfonyl)imide (LiTFSI), lithium bis(oxalato)borate (LiBOB), lithium tetrafluoroborate (LiBF$_4$), and combinations thereof, and
a ratio of EC to GBL is greater than or equal to about 1:1 to less than or equal to about 1:1.5.

* * * * *